(12) United States Patent
Dysarsz

(10) Patent No.: US 9,777,709 B2
(45) Date of Patent: Oct. 3, 2017

(54) TRANSLATING FOIL SYSTEM FOR HARVESTING KINETIC ENERGY FROM WIND AND FLOWING WATER

(71) Applicant: Hans Dysarsz, Delta (CA)

(72) Inventor: Hans Dysarsz, Delta (CA)

( * ) Notice: Subject to any disclaimer, the term of this patent is extended or adjusted under 35 U.S.C. 154(b) by 0 days.

(21) Appl. No.: 14/592,719

(22) Filed: Jan. 8, 2015

(65) Prior Publication Data

US 2016/0201647 A1    Jul. 14, 2016

(51) Int. Cl.
| | | |
|---|---|---|
| F03B 17/00 | (2006.01) | |
| F03D 7/02 | (2006.01) | |
| C25B 1/04 | (2006.01) | |
| H02J 7/00 | (2006.01) | |
| F03B 17/06 | (2006.01) | |
| F03D 5/02 | (2006.01) | |

(52) U.S. Cl.
CPC .............. *F03D 7/0224* (2013.01); *C25B 1/04* (2013.01); *F03B 17/066* (2013.01); *F03B 17/068* (2013.01); *F03D 5/02* (2013.01); *H02J 7/0042* (2013.01); *F05B 2210/16* (2013.01); *Y02E 10/28* (2013.01); *Y02E 10/70* (2013.01); *Y02E 60/366* (2013.01); *Y02E 70/10* (2013.01)

(58) Field of Classification Search
CPC ........................................................ F03D 9/003
USPC .............. 290/44, 55, 54; 104/24; 416/132 B; 415/4.1, 2.1
See application file for complete search history.

(56) References Cited

U.S. PATENT DOCUMENTS

| | | | |
|---|---|---|---|
| 3,730,643 | A | 5/1973 | Davison |
| 3,927,330 | A | 12/1975 | Skorupinski |
| 4,064,821 | A | 12/1977 | Roberts, Jr. et al. |
| 4,102,291 | A | 7/1978 | Sebald |
| 4,163,905 | A | 8/1979 | Davison |
| 4,170,738 | A | 10/1979 | Smith |
| 4,832,569 | A | 5/1989 | Samuelsen et al. |
| 5,758,911 | A | 6/1998 | Gerhardt |
| 5,931,416 | A | 8/1999 | Carpenter |
| 5,992,341 | A | 11/1999 | Gerhardt |
| 6,081,043 | A | 6/2000 | Robles Akesolo |
| 6,254,034 | B1 * | 7/2001 | Carpenter .............. A63H 27/08 244/153 R |
| 6,523,781 | B2 | 2/2003 | Ragner |
| 6,672,522 | B2 | 1/2004 | Lee et al. |
| 6,832,374 | B2 | 12/2004 | Yen et al. |
| 7,075,191 | B2 | 7/2006 | Davison et al. |

(Continued)

FOREIGN PATENT DOCUMENTS

| | | |
|---|---|---|
| CA | 2263966 A1 | 2/1998 |
| CA | 2649354 A1 | 11/2007 |

(Continued)

*Primary Examiner* — Julio Gonzalez

(57) ABSTRACT

Consistent kinetic energy is harvested from wind and from flowing water in streams, rivers and tidal flows using a translating large sail, foil or wing which is permitted to translate in one direction, followed by translating in the opposite direction while pushing or pulling a cable, rod, or tether which in turn turns a pulley, wheel or other device from which traditional sources of power can be generated. The pulley wheel can be used to generate electricity, create hydrogen from water by electrolysis, compress air for transmission or storage, charge batteries, or perform work such as pumping water, heating water, moving objects, etc.

13 Claims, 19 Drawing Sheets

(56) References Cited

U.S. PATENT DOCUMENTS

| | | |
|---|---|---|
| 7,157,805 B2 | 1/2007 | Mooring |
| 7,604,454 B2 | 10/2009 | Power, III et al. |
| 7,654,082 B2 | 2/2010 | Perry et al. |
| 7,709,971 B2 | 5/2010 | Sane et al. |
| 7,714,457 B2 | 5/2010 | Sankrithi |
| 7,750,491 B2 | 7/2010 | Sankrithi |
| 7,902,684 B2 | 3/2011 | Davison et al. |
| 7,977,809 B2 | 7/2011 | Devaney |
| 8,164,213 B2 | 4/2012 | Mahaffy et al. |
| 8,206,106 B2 | 6/2012 | Syrovy |
| 8,400,002 B2 | 3/2013 | Gagnon |
| 8,618,682 B2 | 12/2013 | Syrovy |
| 8,710,693 B2 | 4/2014 | Amano et al. |
| 8,742,613 B2 | 6/2014 | Chen et al. |
| 2004/0164562 A1 | 8/2004 | Latyshev |
| 2005/0046197 A1 | 3/2005 | Kingsley |
| 2007/0297903 A1 | 12/2007 | Morris |
| 2008/0157526 A1 | 7/2008 | Davison et al. |
| 2009/0015014 A1* | 1/2009 | Devaney .............. F03B 13/264 290/53 |
| 2009/0121490 A1* | 5/2009 | Platzer ................. F03B 17/00 290/55 |
| 2009/0127861 A1* | 5/2009 | Sankrithi ............. F03B 13/264 290/54 |
| 2009/0127862 A1* | 5/2009 | Sankrithi ............... F03D 3/067 290/55 |
| 2011/0030361 A1 | 2/2011 | Fopalswamy et al. |
| 2012/0066154 A1* | 3/2012 | Harrington ............. B61B 7/06 705/412 |
| 2012/0187694 A1 | 7/2012 | Engervik |
| 2013/0134261 A1* | 5/2013 | Goldstein ............. F03D 9/002 244/155 A |
| 2014/0077495 A1 | 3/2014 | Fagiano et al. |
| 2014/0077500 A1 | 3/2014 | Platzer et al. |
| 2014/0152018 A1* | 6/2014 | Harrington ............. F03D 5/02 290/55 |
| 2014/0232114 A1 | 8/2014 | Goldstein |

FOREIGN PATENT DOCUMENTS

| | | |
|---|---|---|
| CN | 103670928 A | 8/2012 |
| CN | 103715857 A | 4/2014 |
| CN | 103742341 A | 4/2014 |
| DE | 3209368 A1 | 9/1983 |
| DE | 20 2008013954 U1 | 4/2009 |
| DE | 20 2009011950 U1 | 1/2010 |
| EP | 0841480 A1 | 5/1998 |
| WO | 2007/065717 A1 | 6/2007 |
| WO | 2013124968 A1 | 8/2013 |
| WO | 2014040716 A1 | 3/2014 |

* cited by examiner

TRANSLATING FOIL SYSTEM FOR HARVESTING KINETIC ENERGY FROM WIND AND FLOWING WATER

TECHNICAL FIELD

This invention relates to harvesting kinetic energy from wind and flowing water using a translating foil and converting the kinetic energy into other forms of useable energy such as mechanical energy, electricity, hydrogen, pumped-hydro, heat, and compressed air.

CROSS REFERENCE TO RELATED APPLICATIONS

None.

GOVERNMENT SUPPORT

None.

BACKGROUND

The world's population has a growing need for low-cost, reliable, usable energy, whether that energy is created by burning fossil fuels or by harnessing renewable energy resources, commonly referred to as "clean energy".

The use of fossil fuels as an energy source is falling out of favour due to growing concerns over the associated environmental impact of greenhouse gas and carbon emissions. Further, there is a concern that fossil fuels are a finite resource that one day will be depleted.

Various systems of harvesting renewable energy have been explored and/or used with varying degrees of success and expense.

Horizontal axis turbines are an example of current methods for harvesting kinetic energy from wind and water flow.

Horizontal axis wind turbines have been used in wind to cause blades to rotate around a central pivot point to generate electricity. Horizontal axis water turbines have been used underwater as a method for harvesting energy in flowing water, such as tidal flows or ocean currents.

Horizontal axis fluid turbines all have limitations and deficiencies. The relative rotational speed of the blades near the pivot point is considerably lower than the relative rotational speed of the blades near the outer tips. The speed of the blades near the tips can be so fast that the blades can be a serious hazard to birds or marine wildlife that come near the turbine. Further, the added torque created by gusts and/or very high fluid flows can cause structural failure.

If all the energy coming from fluid movement through a horizontal axis turbine was extracted as useful energy, the fluid speed behind the turbine would drop to zero. However, if the fluid was not moving behind the turbine, no new fluid would pass through the harvest plane and the turbine would stop. In order to keep fluid moving through the turbine harvest plane there has to be some fluid movement behind the turbine, which creates a limit on the efficiency of a horizontal axis fluid turbine.

The power output available from a horizontal axis turbine can be calculated and is directly proportional to a power coefficient relating to how efficiently a turbine converts the kinetic energy in the fluid stream to mechanical energy and then to electricity.

German physicist Albert Betz calculated that no wind turbine could convert more than 59.3% of the available kinetic energy into mechanical energy as the balance of the available kinetic energy is needed to keep the wind moving through the turbine. This became known as the "Betz Limit" which holds that the absolute maximum power coefficient for a horizontal axis turbine is 0.593. Current conventional technology horizontal axis wind turbines achieve power coefficients that are considerably lower than the Betz Limit.

The Betz Limit is inherent to all currently used horizontal axis wind turbines because of the nature of their operation. Current technology wind turbines operate at a fixed location such that the foils are restricted to harvesting kinetic energy from the 'stream-tube' immediately in front of the foils.

Other inherent factors which directly contribute to the power output of conventional horizontal axis fluid turbines include: the area of their harvest plane (more commonly referred to as the 'swept area'); the total area of the foil/s employed; the tip speed of the foils; the fluid speed; and, the aspect ratio of the foil. The length of currently employed wind turbine air foils are inherently limited due the extreme lever forces acting on the blade root mounting structure.

Other forms of renewable energy generation include various forms of hydro generation, such as dams, tidal flows and small scale run-of-river. All have limitations and some have considerable environmental impacts. Large scale hydroelectric installations have significant environmental impacts due to the need to flood large areas of otherwise arable lands. Further, initial building costs of hydroelectric installations can run into the low billions of dollars per site, with an overall time span from initial site assessment and planning, through to first electricity production that can be more than a decade.

The need for viable, reliable, low cost, clean energy sources is growing. There is a need for a new clean and sustainable energy source with low initial cost infrastructure, with low direct operating costs, with fast construction time frames, that is installable in a wide variety of locations, that has few operating limitations, and that creates few, if any, short or long-term hazards to people, wildlife or the planet as a whole.

SUMMARY

Apparatus is provided for converting kinetic energy from a flowing fluid into usable energy. A foil is coupled to a closed-loop cable such that translational movement of the foil causes translational movement of the foil. The foil has an angle of attack that is adjustable between a first angle position and a second angle position such that flowing fluid acting on the foil when in the first angle position causes translational movement of the foil in a first translational direction. When the flowing fluid acts on the foil when in the second angle position the foil is then caused to move translationally in a second translational direction. The cable loops around first and second pulleys such that movement of the cable in the first translational direction causes rotational movement of the pulleys in a first rotational direction. Movement of the cable in the second translational direction causes rotational movement of the pulleys in a second rotational direction. A power-take-off is coupled to one of the pulleys for harvesting usable energy. Control means are incorporated for increasing the load at the power-take-offs to reduce movement of the foil upon the foil reaching an end of the translational operating range. Means are provided for adjusting the angle of attack of the foil between the first angle position and the second angle position.

Apparatus is provided for converting kinetic energy from flowing fluid into useable energy. A tether line is strung between first and second anchor points on opposing hillsides. First and second pulleys are anchored to the tether line. Third and forth pulleys are anchored to a valley floor. A first closed-loop cable passes around the first, second, third and forth pulleys. First and second foils are coupled to the first cable such that translational movement of the first and second foils causes translational movement of the first cable. First and second foils have an angle of attack adjustable between a first angle position and a second angle position, such that flowing fluidacting on the first and second foils when in the first angle position causes translational movement of the first and second foils in a first translational direction, and the flowing fluidacting on the first and second foils when in the second angle position causes translational movement of the first and second foils in a second translational direction. The first cable loops around each of the first, second, third and fourth pulleys such that movement of the first cable in the first translational direction causes rotational movement of the first, second, third and fourth pulleys in a first rotational direction. Movement of the first cable in the second translational direction causes rotational movement of the first, second, third and fourth pulleys in a second rotational direction. A power-take-off is coupled to the first or third pulley for harvesting useable energy. Control means is provided for increasing a load at the power-take-off to reduce movement of the first and second foils upon the first and second foils reaching an end of a first translating operating range. Means are provided for adjusting the angle of attack of the first and second foils between the first angle position and the second angle position.

Fifth and sixth pulleys are also anchored to the tether line. Seventh and eighth pulleys are anchored to the valley floor. A second closed-loop cable passes around the fifth, sixth, seventh and eighth pulleys. Third and fourth foils are coupled to the second cable such that translational movement of the third and fourth foils cause translational movement of the second cable. The third and fourth foils have an angle of attack adjustable between a third angle position and a fourth angle position, such that flowing fluidacting on the third and fourth foils when in the third angle position causes translational movement of the third and fourth foils in a third translational direction, and flowing fluidacting on the third and fourth foils when in the fourth angle position causes translational movement of the fifth and sixth in a fourth translational direction. The second cable loops around each of the fifth, sixth, seventh and eighth pulleys such that movement of the second cable in the third translational direction causes rotational movement of the fifth, sixth, seventh and eighth pulleys in a third rotational direction, and movement of the cable in the fourth translational direction causes rotational movement of the fifth, sixth, seventh and eighth pulleys in a fourth rotational direction. A second power-take-off is coupled to the fifth or seventh pulley for harvesting useable energy. Second control means increase load at the second power-take-off to reduce movement of the third and fourth foils upon the third and fourth foils reaching an end of a second translating operating range. Means is also provided for adjusting the angle of attack of the third and fourth foils between the third angle position and the fourth angle position.

A method for converting kinetic energy from a flowing fluid into usable energy involves adjusting an angle of attack of the foil with respect to fluid flow to cause the foil to laterally translate. Translating the foil laterally in a first lateral direction pulls a cable which in turn causes the first pulley to rotate in a first rotational direction. Applying a load to the first pulley harvests useable energy and helps brake the foil. Adjusting the angle of attack of the foil with respect to fluid flow causes the foil to laterally translate. Translating the foil laterally in a second lateral direction pulls the cable, the cable causing the first pulley to rotate in a second rotational direction as the foil laterally translates. Applying a second load to the pulley harvests useable energy and brakes the foil.

BRIEF DESCRIPTION OF THE DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Fluids, namely air/wind and freshwater and saltwater, are in constant movement around the planet. A translating foil apparatus designed to harness the power in fluid motion (including wind, river flows, tidal flows, and ocean currents), can avoid the limitations of horizontal fluid turbines. The limitations on the amount of power that can be extracted from fluid movement is not constrained by Betz Law in situations where a foil, such as a blade, wing or sail, moves quickly into clean fresh new air. Further, limitations on the maximum surface area for a fluid harvesting system may be significantly reduced or eliminated with a translating foil apparatus.

With reference to the figures, various embodiments of translating foil systems for harvesting kinetic energy from fluid motion and converting the energy into usable forms of energy is shown and described.

Figure 1:
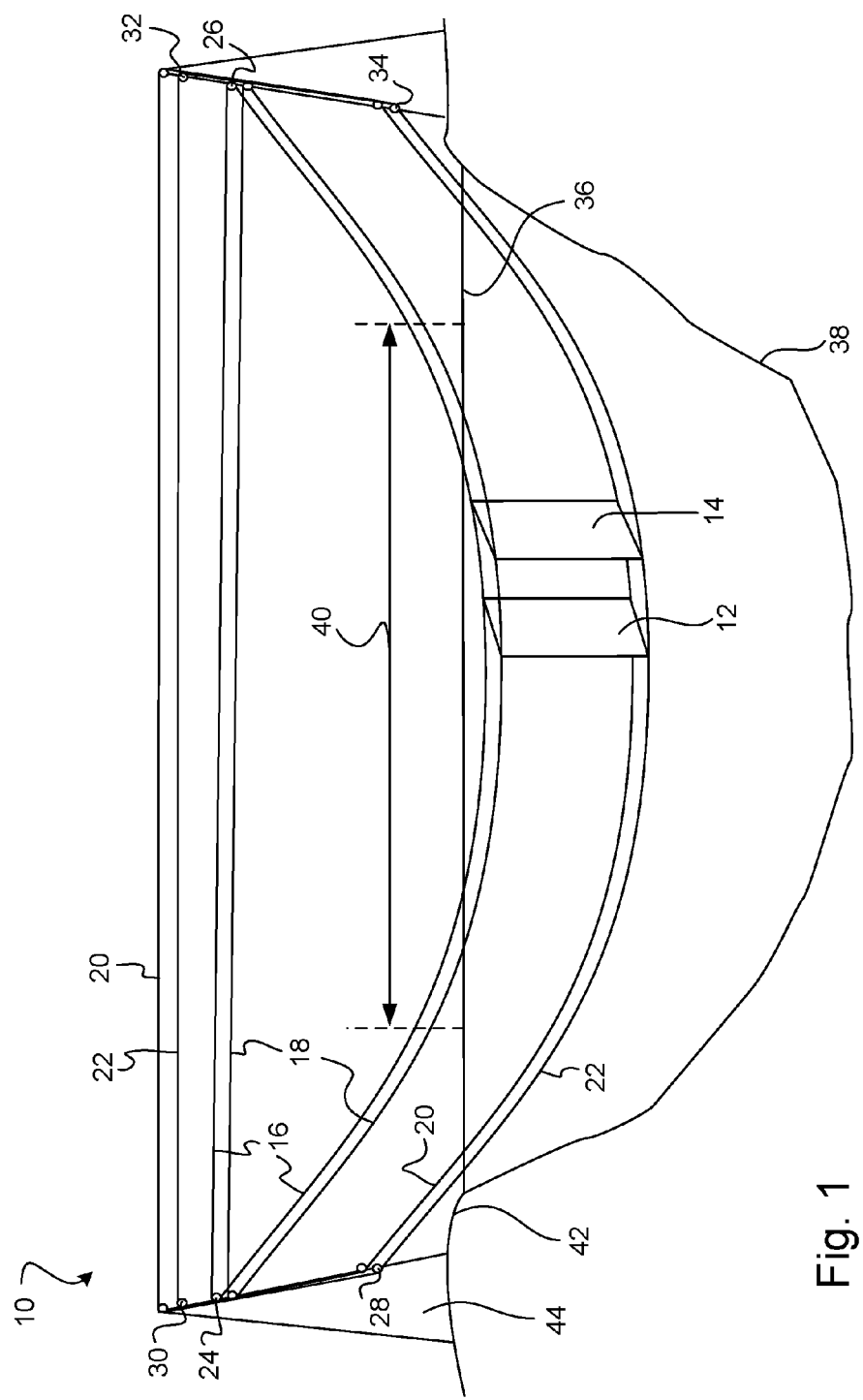
FIG. 1 is a side view of a closed-loop four cable system embodiment of the invention.

FIG. 1 shows a four cable translating foil system 10 having two foils 12 and 14. Foils 12 and 14 could be of any suitable material chosen for durability and suitability in a given installation. Suitable foil materials may include: carbon fibre; Kevlar® (a para-aramid synthetic fiber); stainless steel; canvass; polymer; aluminum; and mild and/or high strength steel. Foils 12 and 14 could be manufactured at centralized facilities in sections or pieces and transported, assembled and replaced in pieces. System construction and reassembly is often possible without the need for extreme cranes onsite or other highly specialized equipment. The use of steel cables and/or steel framing rods and steel hooks can facilitate the 'sewing' or piecing together of flexible material into extra large foils. In system 10, each foil 12 and 14 is firmly attached to each of closed-loop cables 16, 18, 20 and 22 at each corner respectively.

In system 10, the upper cables 16 and 18 rotate around two pulleys whereas the lower cables 20 and 22 rotate around four pulleys. Cable 16 rotates around pulleys 24 and 26. Cable 22 rotates around pulleys 28, 30, 32, and 34. At least one of the pulleys is connected to a power take-off to remove power from the system 10.

System 10 is shown in FIG. 1 as a water-based system with foils 12 and 14 below the waterline 36 and above the water bed 38, which is suitable to operate in a river or tidal flow, as the case may be. A similarly designed system could be used to harness wind power if the waterline was removed from the figure. Natural terrain features can be utilized to provide elevation points for mounting a foil suspension system. For both river and wind installations, system suspension apparatus can be mounted on valley sidewalls.

In the case where system 10 is located in a flowing river, the river flow will be into or out of the plane of the paper of FIG. 1. System 10 can also function in a bidirectional flow into or out of the plane of the paper. Foils 12 and 14 will translate/shuttle sideways dragging/pushing cables 16, 18, 20, and 22, thereby causing the pulleys to rotate, thereby generating mechanical energy at the power-take-off pulley. The total side-to-side distance traveled by foils 12 and 14 is the translational operating distance 40. As the foils 12 and 14 near the end of the translational operating distance 40, the power-take-off can increase the load to slow the translational velocity until the foils 12 and 14 come to a stop. A set of two cables, such as cables 16 and 20 can then be moved relative to the other set of two cables 18 and 22, such that the angle of attack of foils 12 and 14 relative to the stream-flow is changed. This causes the foils 12 and 14 to commence a translation in the opposite direction.

The amount of power taken off and the angle of attack of the foils 12 and 14 can be monitored and adjusted by computer throughout the entire translational operating distance 40 to ensure optimum system output and performance at all times relative to fluid flow velocity.

The relevant conditions can be monitored to constantly adjust system operating parameters to adapt to changing conditions. For example, in a river or tidal installation, the river or ocean level may rise or fall and that may affect the depth of the water and the optimum translational operating distance 40. Hazards such as floating or submerged debris may also affect the navigability of the system operation from time to time. On-site hazard avoidance systems, such as radar, can be incorporated into the 'full authority' system control logic to allow real-time adjustment to the translational operating distance 40 or the course of the foils 12 and 14 to avoid approaching hazards, optimize performance, and avoid surface vessel traffic by locating conflicting debris or surface traffic and momentarily securing the foil array in a safe, non-conflicting portion of the translational operating distance 40.

System 10 is shown with support towers 44 on shore 42 that supports pulleys 24, 26, 28, 30, 32 and 34. Most of the serviceable parts of the system are above the waterline and require little maintenance. With water installations, one or both support towers 44 could be located on anchored barges or using another manner of mounting pulleys above the waterline.

The translational operating distance 40 can be as large as the geography of the location permits and/or cable strength allows. For example for harvesting ocean currents the translational operating distance 40 may be kilometers long whereas for harvesting river flow the translational operating distance 40 may be 50 meters long, or less, as the location permits.

System 10 is shown with two foils 12 and 14, however system 10 can be viable with as few as one foil, and may be viable with over one hundred foils. The number of foils used can be chosen to suit the installation swept area available and/or to optimize system performance in a given location. As the number of foils increases, the total foil surface area increases and the power generated in each power stroke increases. However the lateral distance taken up by the addition of more foils reduces the translational operating distance 40.

Figure 2:
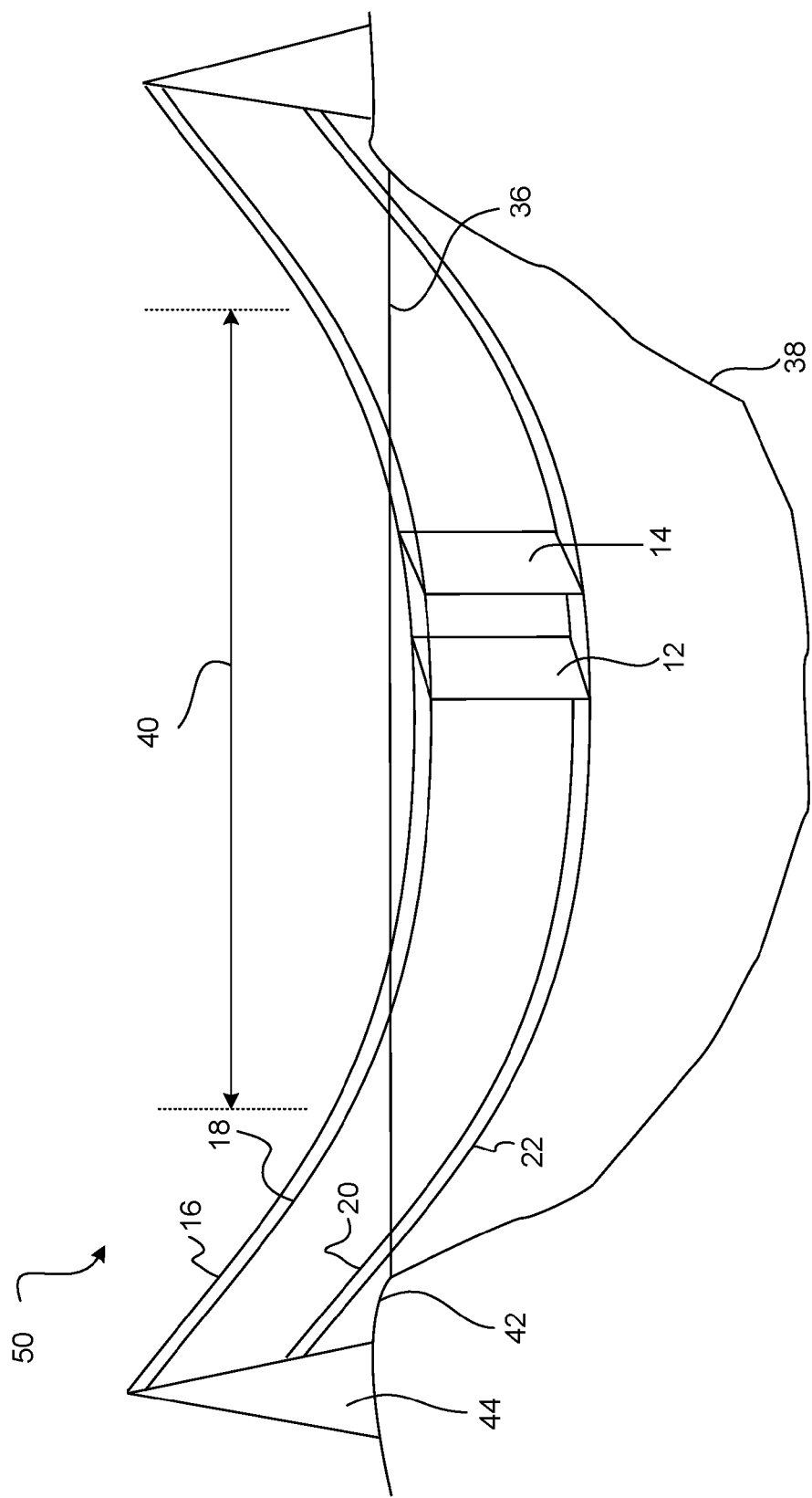
FIG. 2 is a side view of another closed-loop four cable system embodiment of the invention.

FIG. 2 shows a four cable translating foil system 50 similar to system 10 except that each of cables 16, 18, 20 and 22 has a second set of foils (not shown) instead of having a closed-loop cable return that is unburdened.

Figure 3:
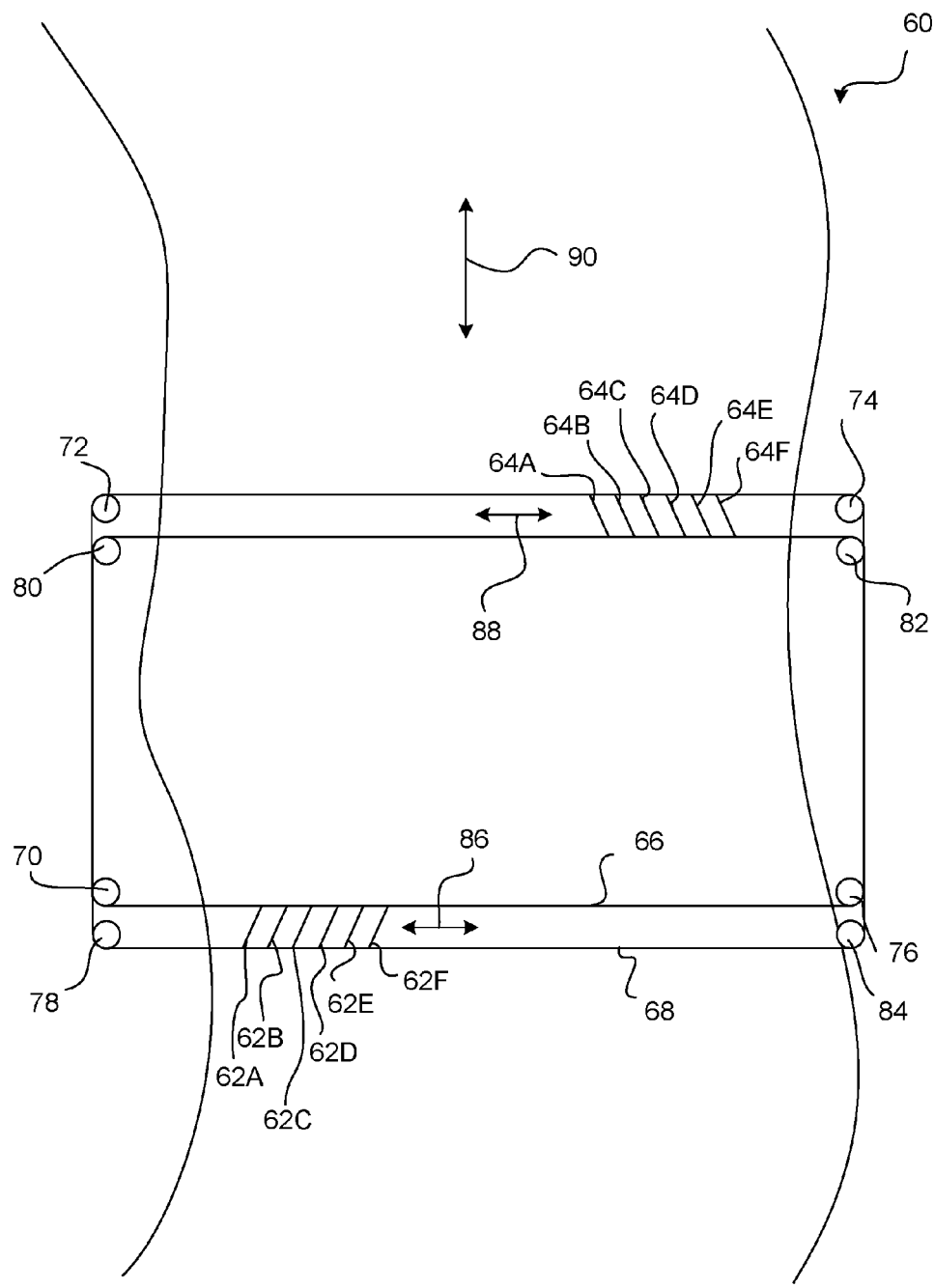
FIG. 3 is a top plan view of another closed-loop four cable system embodiment of the invention.

FIG. 3 shows a four cable translating foil system 60 having two sets of foils. The first set of foils 62A, 62B, 62C, 62D, 62E, and 62F, collectively foil set 62, is comprised of six foils but is otherwise analogous to the set of two foils 12 and 14 in system 50. The second set of foils 64A, 64B, 64C, 64D, 64E, and 64F, collectively foil set 64, is comprised of six foils which is attached to the same four cables as foil set 62. As FIG. 3 is a top plan view only cables 66 and 68 are shown, each of which is attached to a top corner of each foil in foil sets 62 and 64.

Closed-loop cable 66 passes around pulleys 70, 72, 74 and 76. Closed-loop cable 68 passes around pulleys 78, 80, 82 and 84.

Foil set 62 shuttles back and forth along a translational path in the directions indicated by arrow 86. Foil set 64 shuttles back and forth along a translational path as indicated by arrow 88. As foil set 62 and 64 are attached to the same cables, each set of foils move in coordinated fashion, yet in opposite directions, across the fluid stream. The increased number of foils on the same cable loop increases the power that can be generated in a single power stroke. Power is taken off the system at one or more of the pulley locations. Although not seen in this view, underneath cable 66 and 68 and its associated pulleys, there are an additional two cables and corresponding sets of pulleys to complete the four cable translating foil system 60.

Typical fluid flow for a system as shown in FIG. 3 is unidirectional or bidirectional as shown by arrow 90. The angle of attack of foils 62 and 64 can be adjusted according to fluid direction by way of system-specific dedicated computer processing. Computer-calculated adjustments can be made in real-time as described above with respect to system 10.

Figure 4:
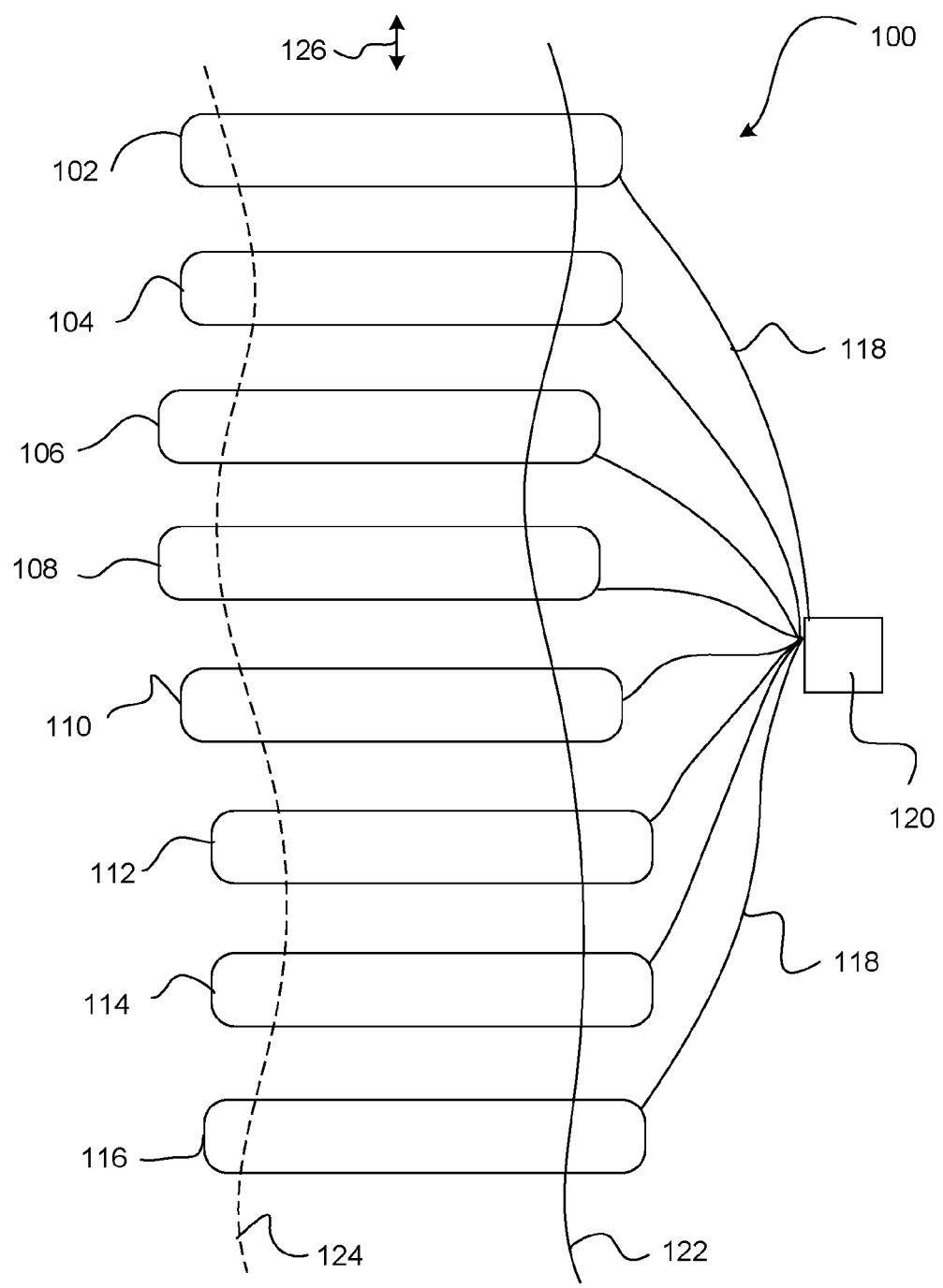
FIG. 4 is a top plan view of a multi-system power generation embodiment of the invention.

FIG. 4 shows a top plan view of a multi-system power generation setup 100. Eight translating foil power generation systems 102, 104, 106, 108, 110, 112, 114 and 116 are shown. Alternate embodiments could include many more translating foil power generation systems linked together. Each of these foil power generation systems could be system 10, 50, or 60 or any combination thereof or any other suitable translating foil generation system. Each system 102, 104, 106, 108, 110, 112, 114 and 116 has power taken from the system via connection 118 to power house 120 for processing, storage and/or transmission. The power-take-off process could be a number of known and proven processes, including compressed air, direct current (DC), pumped hydro, etc. The Power House 120 will convert the raw translating foil system energy to more useable energy, which could be dispatchable grid quality electricity, temporary compressed air mechanical energy, molten salt, heat or steam energy, etc.

In the case where setup 100 is used directly to generate grid quality dispatchable electricity, DC electricity may be generated at each system 102, 104, 106, 108, 110, 112, 114 and 116 and then fed into the power house 120 for conversion and stepping up to transmission line high voltage. At shorter transmission distances to the power house, distance of less than 50 km, much lower cost DC can be more cost effectively utilized to transmit and 'pool' the 'raw' or unconditioned energy produced by many linear motions systems. Since the cost of producing 'grid quality electricity' is a substantial cost of electricity production, the low cost DC or compressed air 'short distance energy transfer approach' will facilitate a number of linear motion variant systems to operate in unison as a 'single generation unit'. In this manner wind, tidal and ocean current linear motion systems could all pool their 'raw' harvested energy in a highly cost-effective manner, to one single, local, energy conditioning, dispatchable grid quality electricity production center. When this approach is coupled with many translating foil systems working together, a highly consistent power output can be realized.

For example, a single operating group may have one hundred or more translating foils attached, all systems will be controlled by centralized computer processing which will control individual system end of travel/harvest stop points. By doing so, it is possible to greatly diminish or even avoid completely, any noticeable drops in overall system output. When a number of translating foil systems are centrally controlled and operating at consistent speeds, as adjusted by way of real-time angle of attack adjustments across the operating translational distances, smooth power output can be created.

Single stand-alone translating foil systems can produce smooth dispatchable grid quality power, by way of integrating an intermediary 'short term' energy storage process such as the use of capacitors, molten salts, or compressed air, etc.

In alternate cases, setup 100 can be used to compress air or generate hydrogen via simple DC production at the power-take-off of each system. The produced hydrogen can then be stored and/or transported via pipeline, barge, rail or road truck. The production of ultra lowcost hydrogen as the energy product of remote location translating foil farms, will make remote location translating foil farms highly viable (as hydrogen is a relatively easily transportable fuel and more and more uses for hydrogen are being found today).

FIG. 4 shows a shoreline or mountainside 122, and an optional shoreline or mountainside 124. Shoreline or mountainside 124 is optional because there is no requirement that there be shore or dryland as one or both sides of a system could be mounted on a barge on water or on another suitable structure. A typical fluid flow for setup 100 is in one or both directions as shown by arrow 126, although the systems can accommodate considerable variations in the direction of fluid flow.

Figure 5:
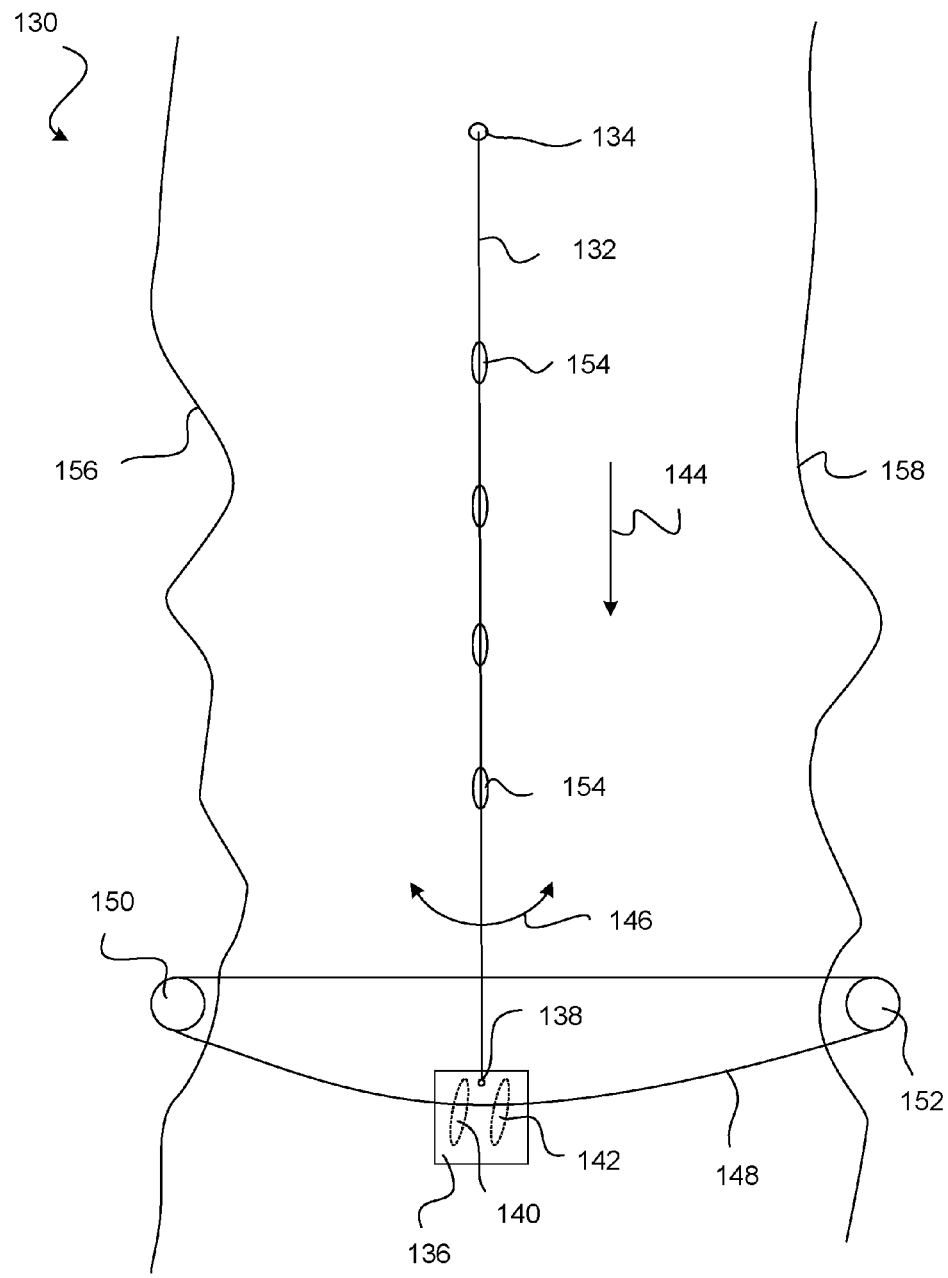
FIG. 5 is a top plan view of an anchored single-cable-loop embodiment of the invention.

FIG. 5 shows an anchored single-cable-loop translating foil system 130 having a tether line 132 that is anchored at an anchor point 134. Tether line 132 connects to foil ferry 136 at connection point 138. Foil ferry 136 has foils 140 and 142 in the fluid stream. System 130 is suitable for a river flow installation where fluid flow is generally in a unidirectional direction as indicated by arrow 144. As the angle of attack is adjusted for foils 140 and 142, foil ferry 136 can shuttle back and forth along a translational operating distance while tether line 132 rotates in the directions 146 about anchor point 134. As the foil ferry 136 moves side-to-side, it drags and/or pulls dragline 148 which in turn turns pulleys 150 and 152. At least one of the pulleys 150 and 152 is connected to a power-take-off to remove usable power from the system.

Tether line 132 may be equipped with various flotation devices 154 and/or lights to mark its presence for marine navigation.

To complete the picture of system 130, this is typically designed as a river flow situation between shorelines 156 and 158. Foil ferry 136 may be equipped with flotation devices to ensure that it remains on the surface. Pulleys 150 and 152 may be elevated to permit marine traffic navigation under dragline 148.

Figure 6:
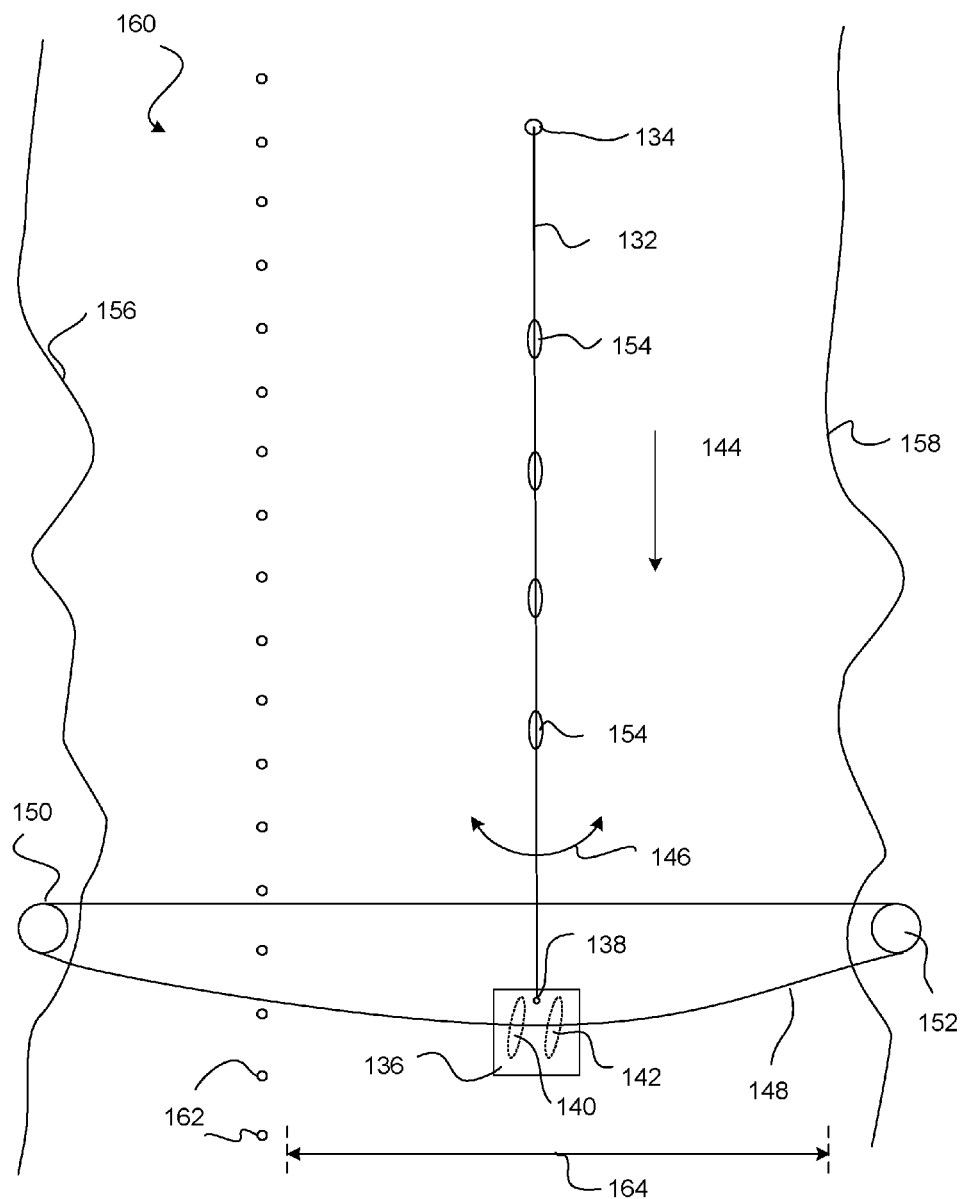
FIG. 6 is a top plan view of another anchored single-cable-loop embodiment of the invention.

FIG. 6 shows a top plan view of a single-cable-loop system 160 which is similar to system 130 except that a portion of the waterway has been marked off by buoys 162 to clearly indicate to marine traffic or other users of the waterway that the foil ferry 136 and the anchor line 132 will not pass into that area. Foil ferry 136 will shuttle back and forth along its operating translational distance 164.

Although anchor point 134 is shown located on water in systems 130 and 160, in some cases it may be suitable to place anchor point 134 on land, particularly in locations with a curved shoreline, such as where a river has a significant bend.

Figure 7:
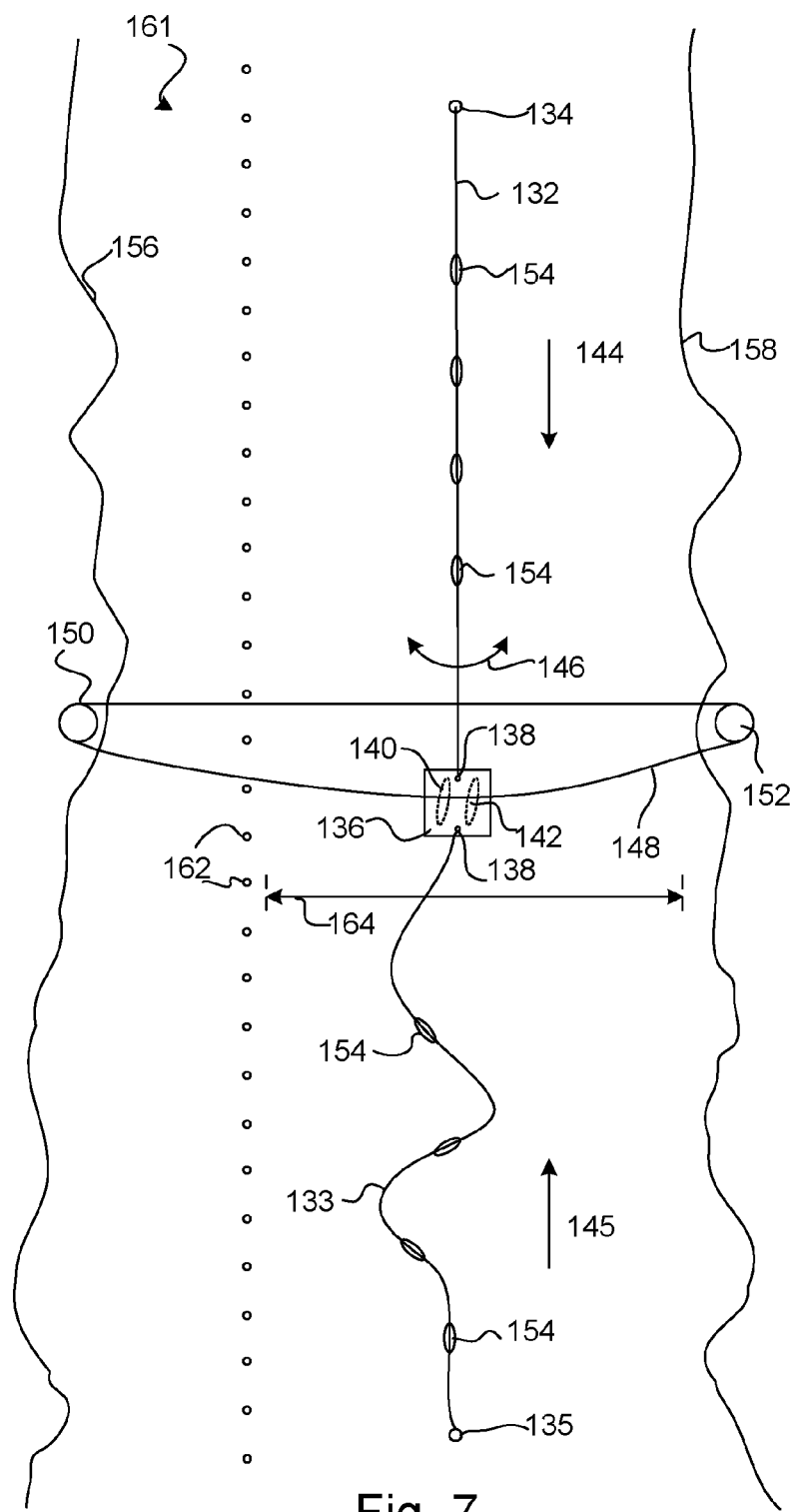
FIG. 7 is a top plan view of another anchored single-cable-loop embodiment of the invention.

FIG. 7 shows a top plan view of a single-cable-loop system 161 suitable for bidirectional water flow. System 161 is similar to system 134 except that it has a second tether line 133 that is anchored at anchor point 135. Second tether line 133 is on the opposite side of foil ferry 136 than tether line 132 and is slack when tether line 132 is taut. When the water flow reverses, tether line 132 will become slack and second tether line 133 will become taut. Foil ferry 136 can operate whether water is flowing generally in direction 144 or generally in direction 145.

Figure 8:
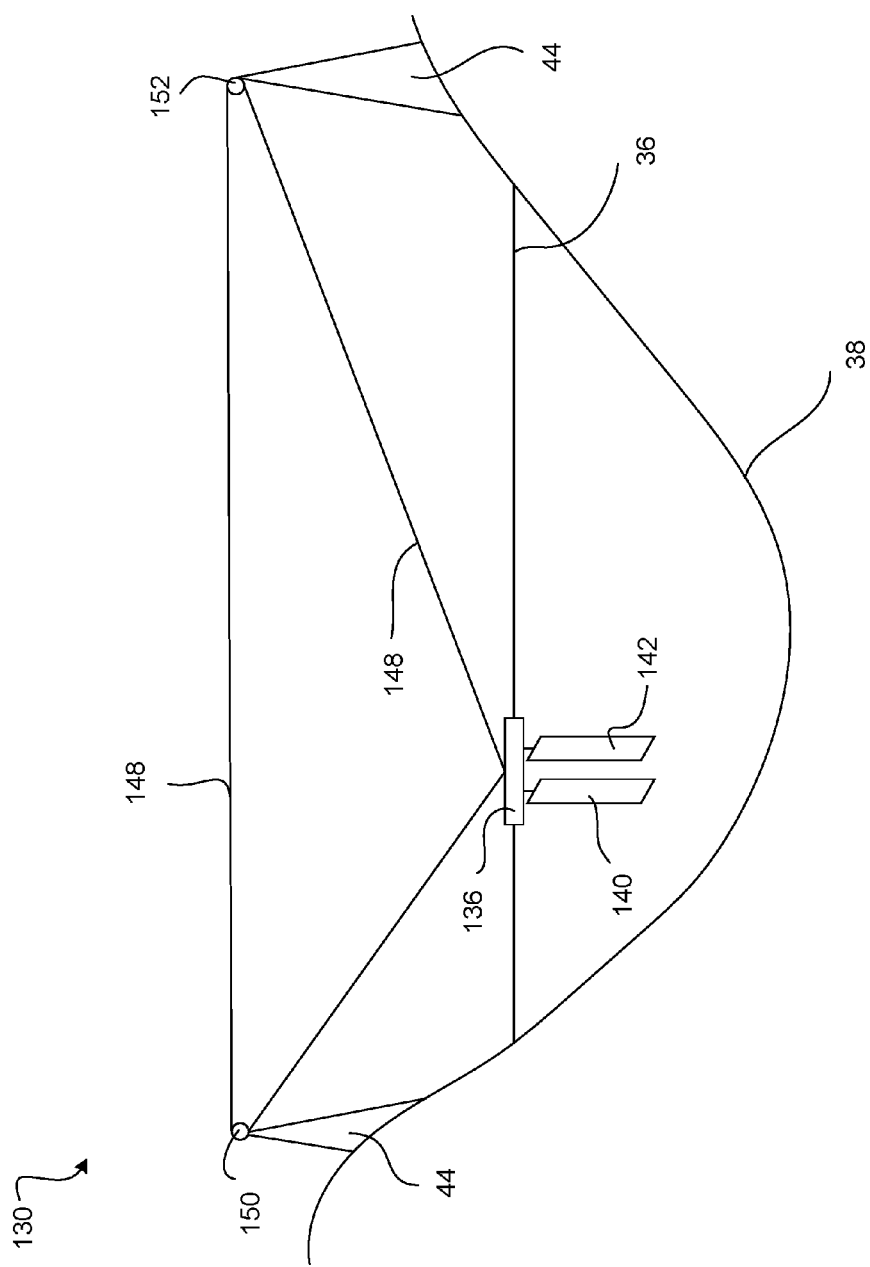
FIG. 8 is a side view of the embodiment of FIG. 5.

FIG. 8 shows a side plan view of system 130 which was shown in a top plan view in FIG. 5. FIG. 8 shows that pulleys 150 and 152 can be elevated by support structures 44 to raise dragline 148 above the water. Dragline 148 has enough slack to allow for higher or lower water levels due to rising or falling rivers or ocean tides. As discussed previously, translational operating distance 164 can be adjusted by onboard computer means for controlling the angle of attack of foils 140 and 142. Further, radar or other location detection means can be used to automatically assess potential hazards and adjust the course of the foil ferry 136 to optimize performance and avoid danger.

Figure 9:
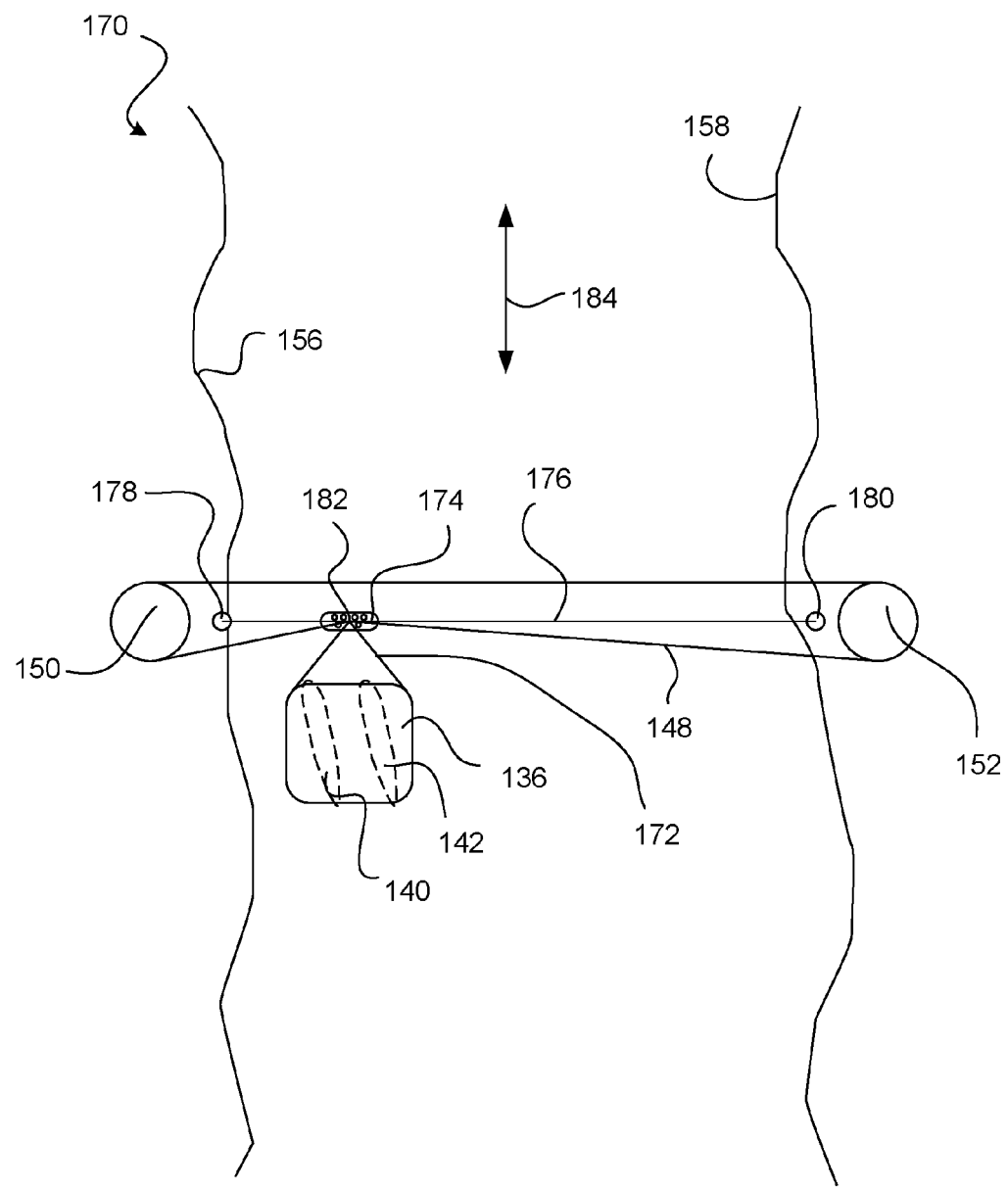
FIG. 9 is a top plan view of a shuttle-anchored single-cable-loop embodiment of the invention.

FIG. 9 shows a single closed-loop cable system 170 where the foil ferry 136 is anchored against fluid flow by connection 172 to shuttle 174 which freely rides side-to-side along tether line 176. Tether line 176 is an elevated tether system retention line connected to two elevated tower anchors 178 and 180. Dragline 148 is connected to shuttle 174 at point 182. By elevating dragline 148 and tether line 176, the waterway can remain navigable to other marine traffic as foil ferry 136 makes its way back and forth.

System 170 can operate in a bidirectional fluid flow 184.

Figure 10:
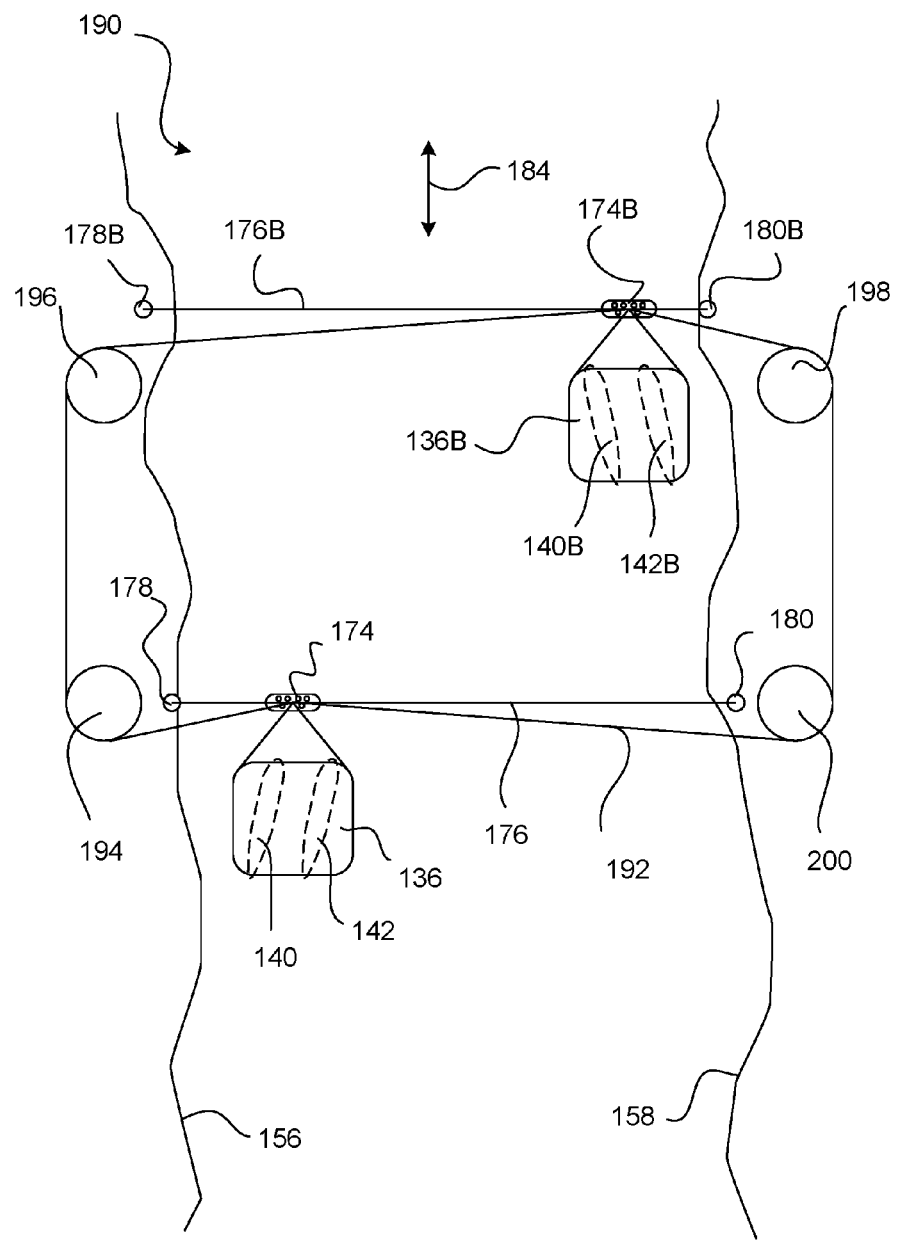
FIG. 10 is a top plan view of another shuttle-anchored single-cable-loop embodiment of the invention.

FIG. 10 shows a top plan view of a single closed-loop cable system 190 having two foil ferries 136 and 136B which shuttle back and forth along separate shuttles 174 and 174B, which in turn travel along anchor lines 176 and 176B respectively. Both shuttles 174 and 174B are connected to dragline 192, which in turn follows a path around pulleys 194, 196, 198 and 200.

Figure 11:
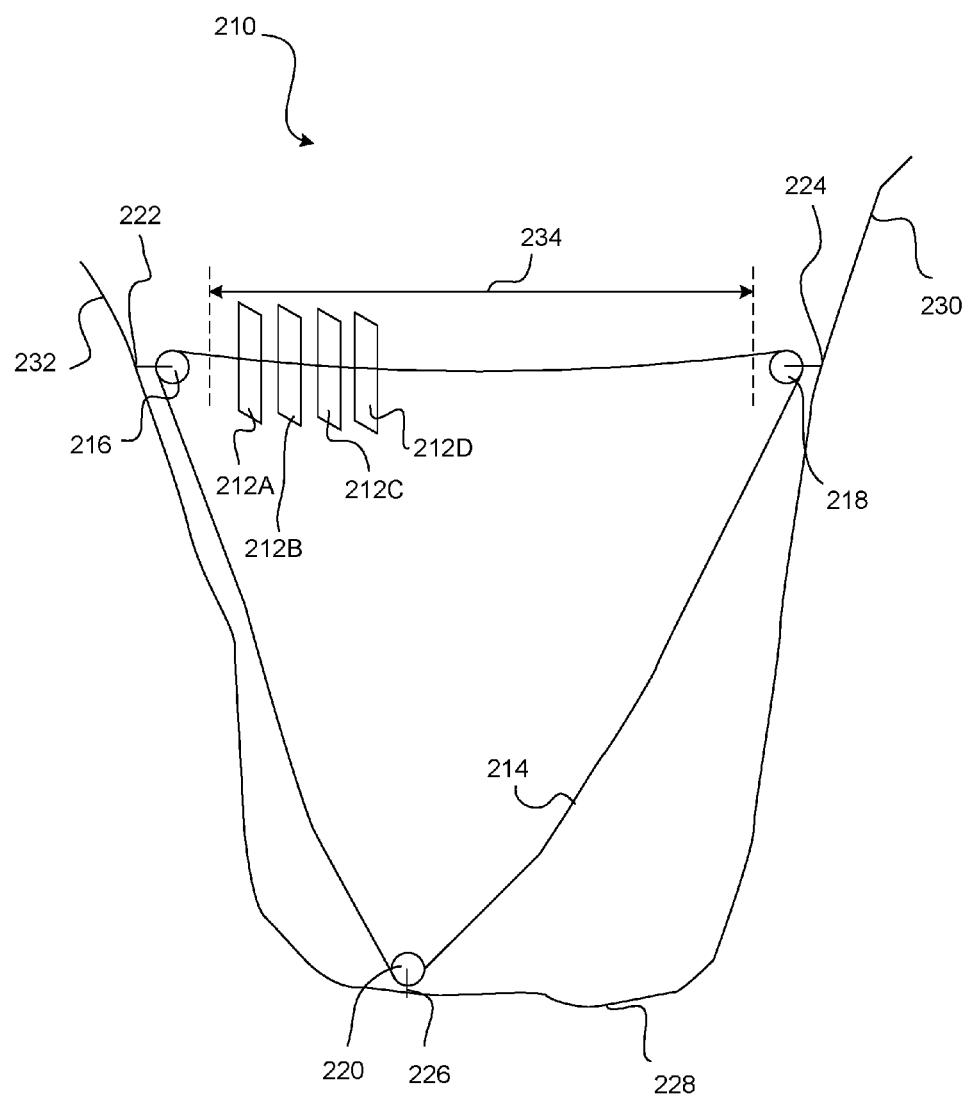
FIG. 11 is a side view of a self-orienting foil single-cable-loop embodiment of the invention.

FIG. 11 shows a single closed-loop cable system 210 having a series of self-orienting foils 212A, 212B, 212C, and 212D, hereinafter collectively foil set 212. Foil set 212 is affixed to one or more support cables 214, which in turn pass around pulleys 216, 218 and 220. Although it may appear to be a single cable 214 in FIG. 11, a second or third cable can be included along the same path to provide redundancy to avoid the full system crashing in the event that a single cable ever breaks. The pulleys are attached to the ground at points 222, 224 and 226 respectively. In the system 210, pulley 220 is a mechanical power-take-off so that the mechanical energy converted by the foils from the kinetic energy fluid stream can be accessed at the most easily accessible, lowest cost location, for example at the valley floor 228. In system 210 it is anticipated that sides 230 and 232 can be any kind of natural terrain elevation feature such as mountaintops, mountainsides, hillsides, valley sides, etc.

In operation, foil set 212 shuttles back and forth along the translational operating distance 234.

Figure 12:
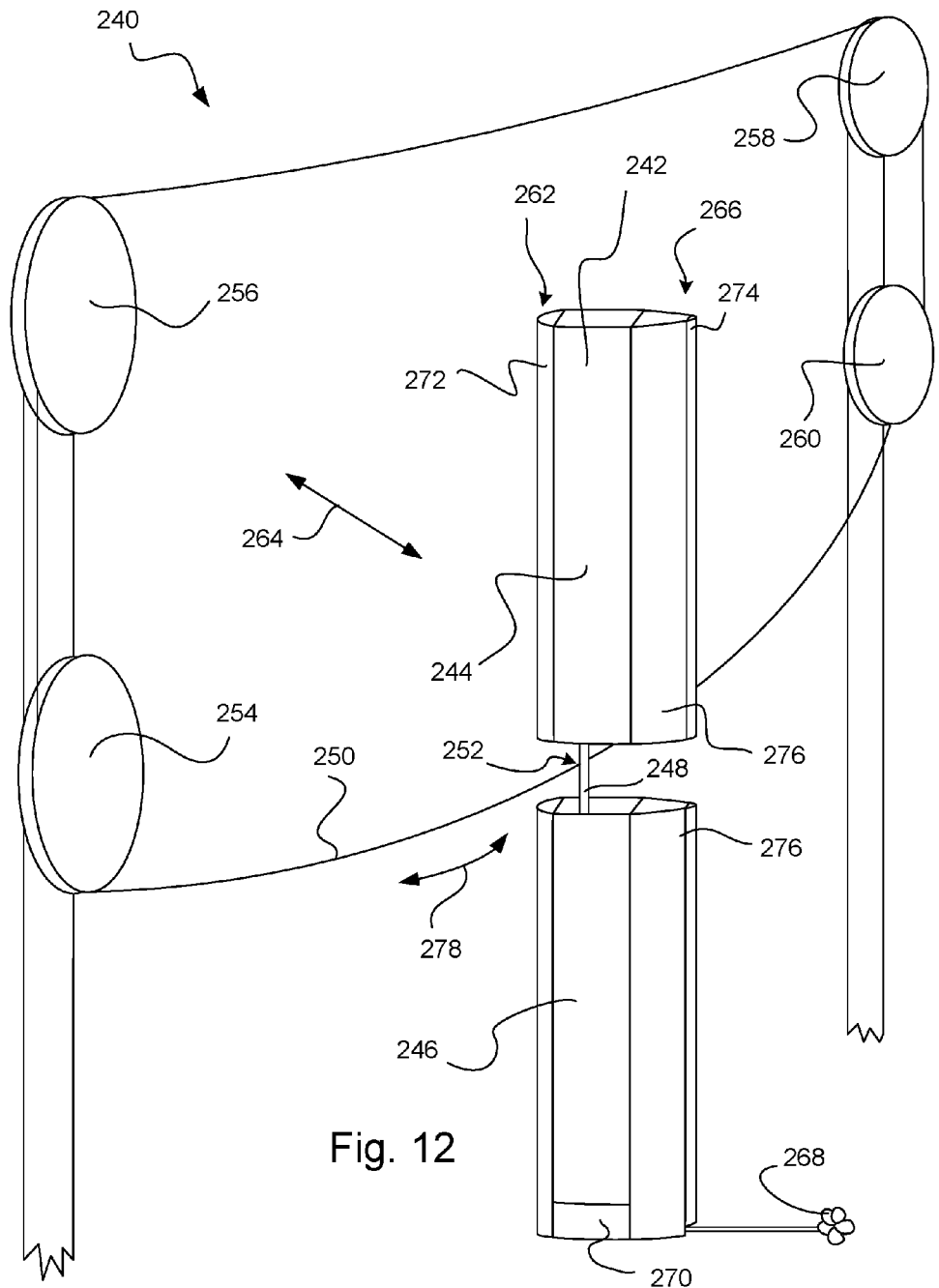
FIG. 12 is a perspective view of another self-orienting foil single-cable-loop embodiment of the invention.

FIG. 12 shows a perspective view of a simplified single-cable-loop, bidirectional, self-weathercocking foil system 240. Self-orienting foil 242 is comprised of a top portion 244 and a bottom portion 246 connected by a central rod 248. Foil 242 is affixed to cable 250 via rod 248 at point 252. The central rod 248 is offset from center to allow for weathercocking of the foil 242 into the wind at all times. Cable 250 passes around pulleys 254, 256, 258 and 260.

Foil 242 is self-orienting such that leading edge 262 faces toward the direction 264 of the oncoming flow of fluid and trailing edge 266 faces away from the fluid flow.

Embodiment 240 may be suitable for stringing between two mountain peaks, between two towers, or between two structures between which wind typically flows in the general direction of one of the arrowheads of arrow 264. Foil 242 may be of any suitable shape and size as known in the art and/or as appropriate for the particular installation. The larger the size of the foil the greater the power output that may be attained. One or more of the pulleys 254, 256, 258 and 260 may incorporate a power-take-off such that power generated by movement of the cable is translated into usable energy, such as generating electricity, creating hydrogen from water electrolysis, compressing air, charging batteries, or the like.

Foil 242 has an onboard system for adjusting the angle of attack of the foil with respect to the wind. A small onboard horizontal wind turbine 268 is used by the controller in the equipment control battery box 270 to charge a battery back-up and to power a system for monitoring conditions and controlling the orientation of the foil. The orientation of the foil is adjusted by causing a leading edge device 272 to move towards or away from the wind, and similarly by causing trim tab 274 to move towards or away from the wind. Movement of the relatively small trim tab 274 will result in movement of the longer flap 276 which will effectively create a large camber on the side of the foil in which travel direction is desired. By coordinated controlled movement of leading edge device 272 and trim tab 274 the movement of the foil 242 will pull cable 250 back and forth in a shuttling motion 278.

Embodiment 240 operates by positioning foil 242 with an angle of attack to the wind such that when it is close to pulley 254 foil 242 begins translating towards pulley 260 pulling cable 250 with it.

As foil 242 begins its acceleration, no power is taken off from the power-take-off. This facilitates a very rapid acceleration to the desired translational velocity at which to begin the energy harvest process. The unloaded acceleration time is determined by the onboard computer through airspeed measuring devices. The airspeed information for foil 242 may come from aircraft type Pitot tubes and/or from anemometers or from a suitable alternative or a combination thereof. Once foil 242 has reached a predetermined minimum translational velocity, the power-take-off begins to take power from the rotation of one of pulleys 254, 256, 258 or 260. The load applied at the power-take-off can be used to control the translational velocity of foil 242 as it translates between pulley 254 and 260. As foil 242 nears the end of its available translational space, as it nears pulley 260, it is slowed by increasing the load placed on the cable at the power-take-off. Like all other translating foil systems, if a power-take-off system happens to fail, and the translating foil(s) enters a runaway condition, foil 242 can be slowed and stopped by applying a conventional friction brake mounted on one or more of the system pulleys.

Once foil 242 has stopped its translational velocity, leading edge device 272 and trim tab 274 are returned to the neutral position which allows 242 to weathercock into the wind. From the neutral position, the leading edge device 272 and trim tab 274, are then repositioned via servo power, to form a camber on the opposite side of the foil. This adjustment then causes a pressure differential on the opposite side of the foil, causing the created thrust to move the foil in the opposite translational direction. As foil 242 begins translating away from pulley 260, initially no load is placed on it at the power-take-off. Once foil 242 reaches a predetermined minimum translational velocity, the harvest load begins to be applied at the power-take-off again.

In embodiment 240 power is taken off as foil 242 shuttles between opposing ends of its translational operating range, moving from proximate to pulley 254 to proximate to pulley 260. Alternate embodiments may include more than one foil 240 attached to cable 250. An increase in the number of foils on the same cable between pulleys 254 and 260 will result in a shorter translational operating range, but will result in an increase in power during translational power harvesting.

Foil 242 will consist of rigid frames and be covered using any suitable material, preferably material that is lightweight, durable and has a demonstrated long service life under extreme operating conditions. Carbon fiber or Kevlar® are two examples of suitable material, along with aircraft grade alloys, etc. The aerodynamic properties of the foil and its material may be, in part, chosen to reduce the weight on the system.

Figure 13:
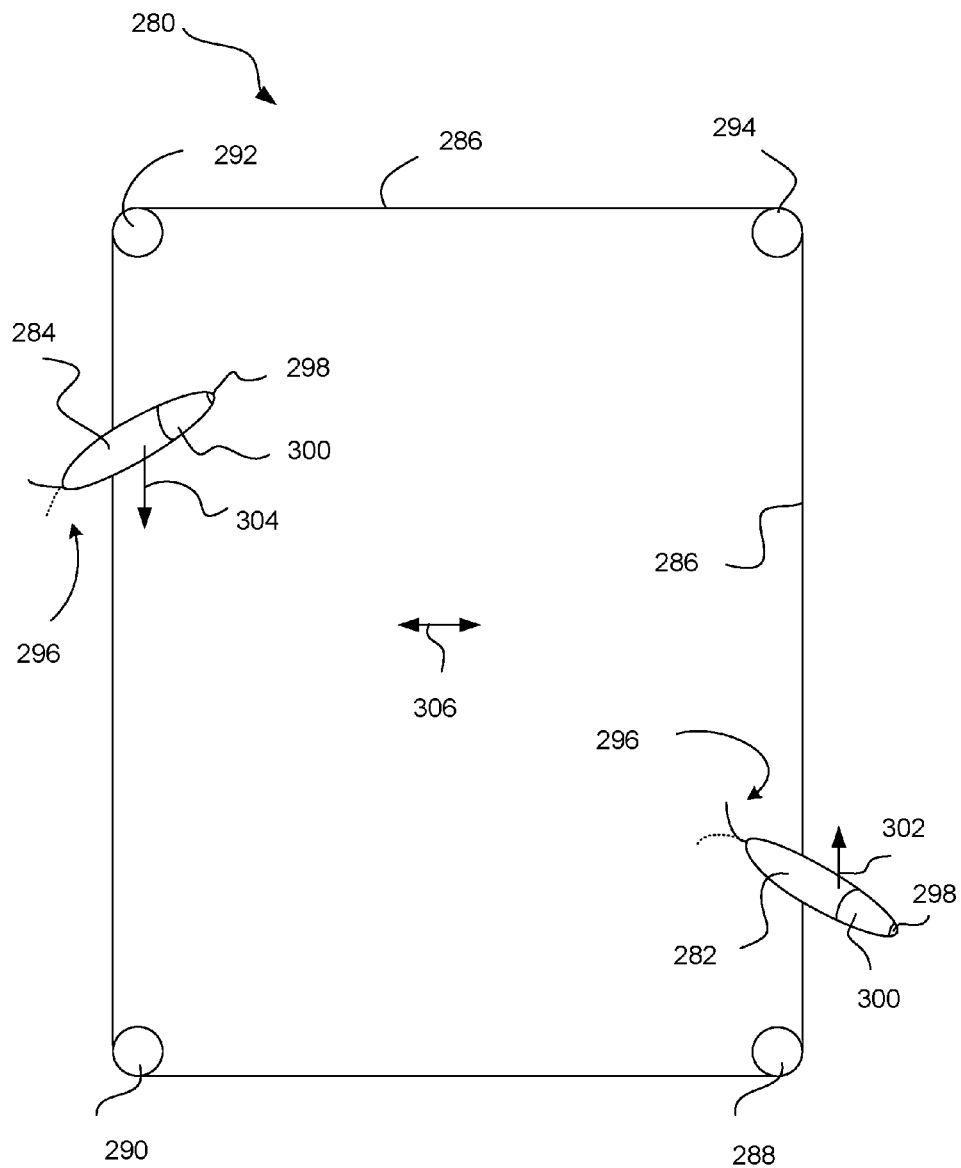
FIG. 13 is a top plan view of another self-orienting foil single-cable-loop embodiment of the invention.

FIG. 13 shows a single-cable-loop double weathercocking foil embodiment 280 having two weathercocking foils 282 and 284 attached to cable 286. Cable 286 passes around pulleys 288, 290, 292 and 294. One of the pulleys, such as pulley 288 is combined with a power-take-off to apply load to the system and remove power. Foils 282 and 284 are attached to cable 286 somewhat off-center so that the wind immediately weathercocks the foils such that the leading edge 296 is positioned to face the prevailing wind.

The relative angle of attack for each of foil 282 and 284, with respect to the direction of the wind 306, is adjusted and controlled using an onboard computer or programmable logic controller system to adjust the positioning of leading edge devices 296 and trim tabs 298 to positions which will yield the maximum or desired harvest potential. Trim tab adjustments cause movement of flap section 300. Embodiment 280 shows a leading edge device 296 comprised of a relatively simple moveable flap which is an alternate functioning example as compared to the leading edge device 272 shown in embodiment 240. The orientation of the leading edge device 296 is shown in a solid line to indicate a position for the leading edge device 296 that could cause foils 282 and 284 to translate in directions 302 and 304 respectively. Reorientation of leading edge device 296 to the position shown in a dotted line would result in an adjustment to the angle of attack of foils 282 and 284 such that the translational direction of the foils would be reversed.

Figure 14:
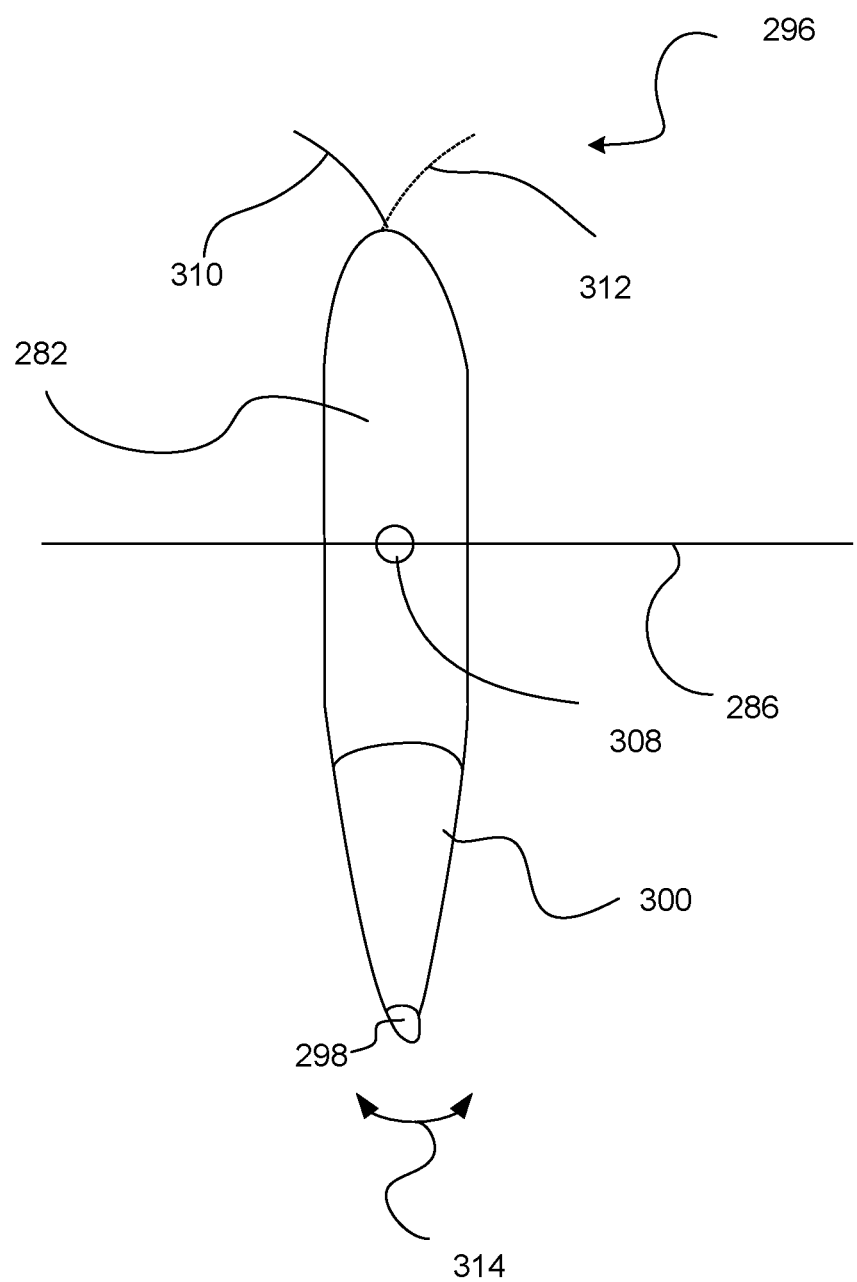
FIG. 14 is a top plan view of a self-orienting foil.

FIG. 14 shows an enlarged cross-sectional view of self-orienting (weathercocking) foil 282 which is affixed to cable 286 at a central rod 308. Leading edge device 296 is shown in the first position 310 and is moveable into second position 312 to reverse the angle of attack. In practice, the positions in which the leading edge device 296 can be positioned for adjusting the angle of attack is a highly variable continuum, but these two positions are shown as examples of positions to adjust the angle of attack to reverse the direction of the foil 282.

FIG. 14 shows trim tab 298 in the instance that it has just been adjusted to the right to create a camber on one side of the foil before the wind-flow adjusts the positioning of tail tab 300 to move tail tab 300 to the left. As indicated by arrow 314, the positioning of trim tab 298 can be adjusted by the onboard controller to move side-to-side in the directions shown in arrow 314, which in turn will cause the larger tail flap 300 to adjust its position, affecting the angle of attack of the foil.

Figure 15:
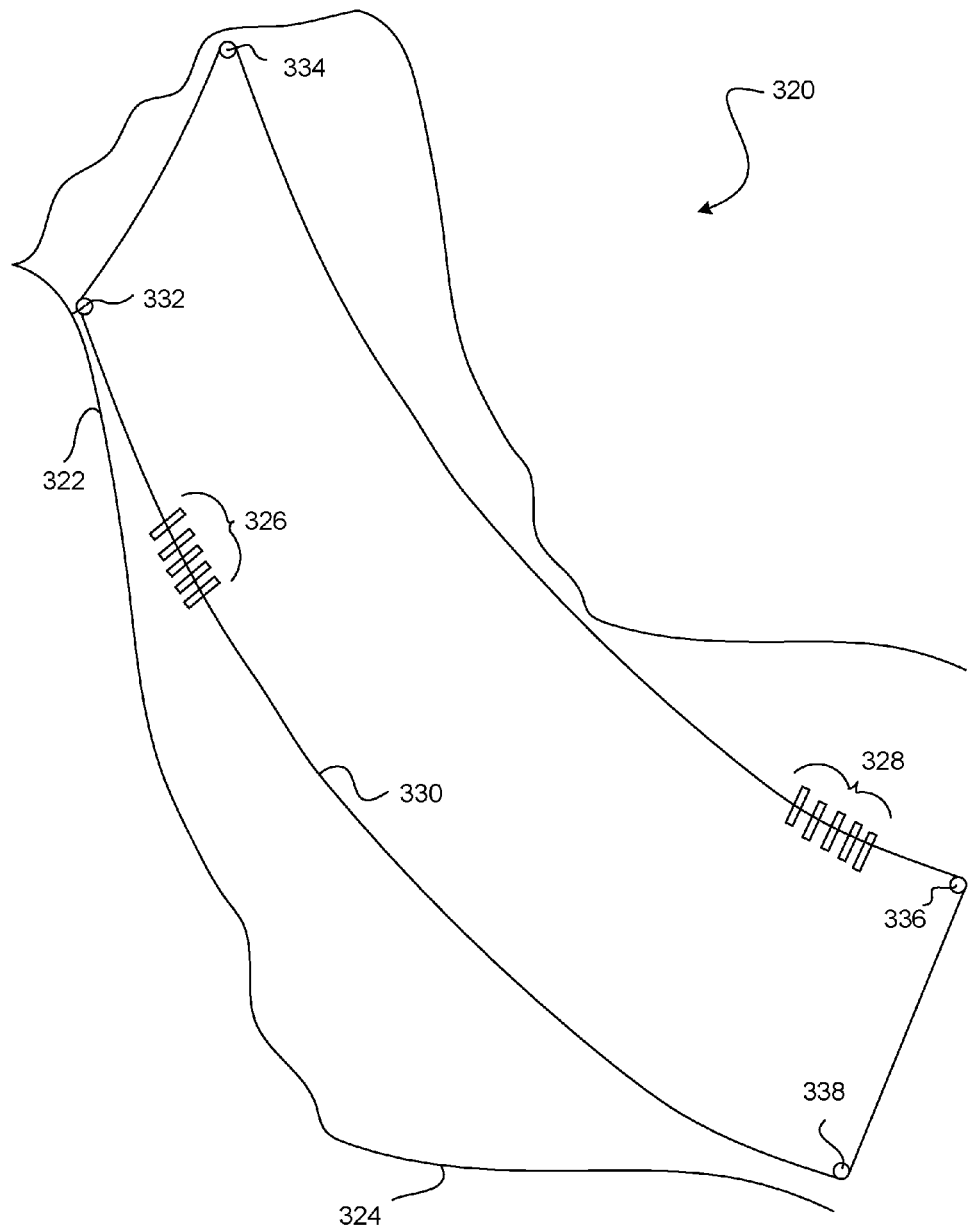
FIG. 15 is a perspective view of another self-orienting foil single-cable-loop embodiment of the invention.

FIG. 15 shows single-cable-loop embodiment 320 located on terrain ranging from a mountainside 322 to a valley 324. Groups of self-orienting foils 326 and 328 are attached to different runs of closed-loop cable 330. Cable 330 passes around pulley 332, 334, 336 and 338 to complete its loop. Foil groups 326 and 328 shuttle up and down the mountainside 322, generating power taken at a power-take-off at pulley 336 or 338.

Figure 16:
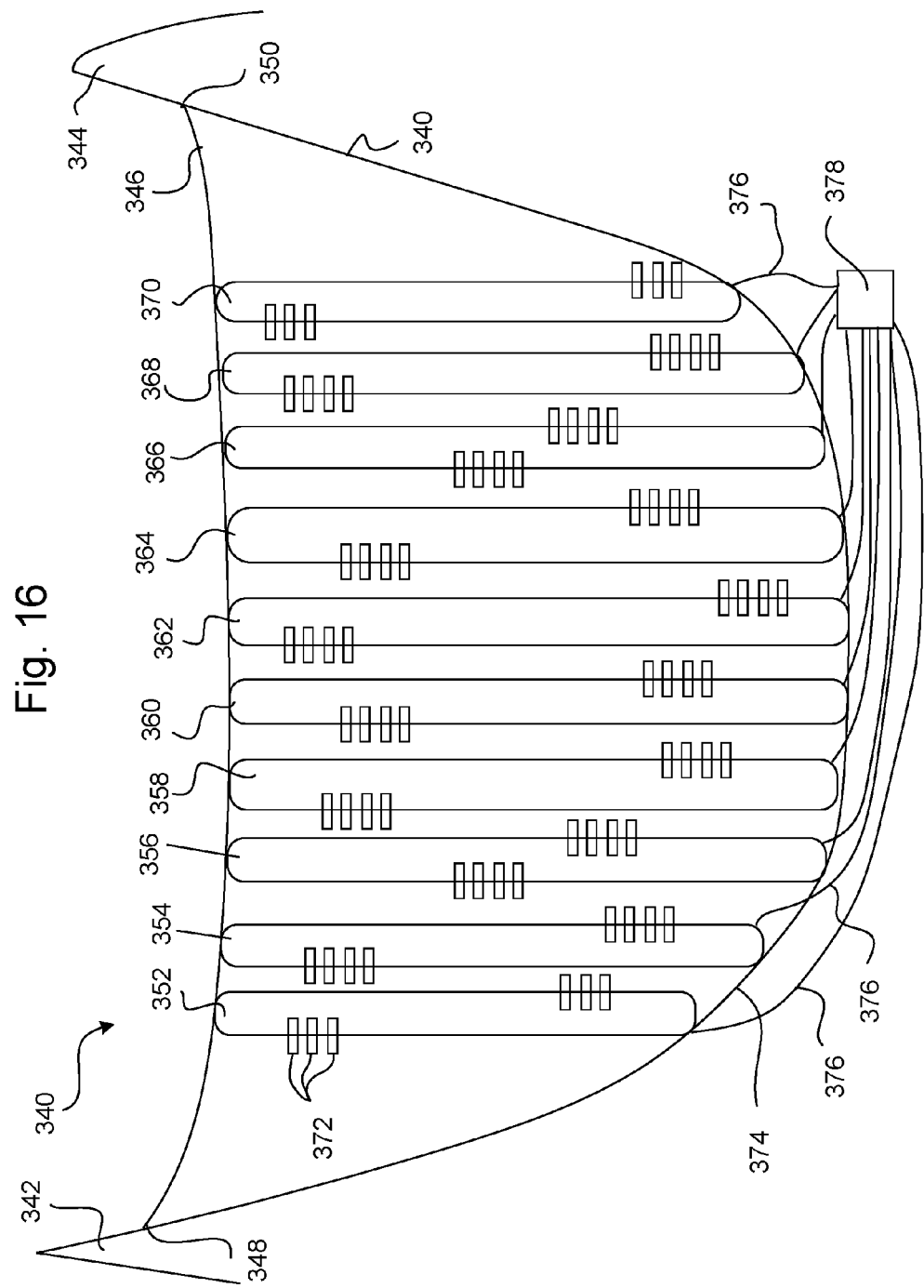
FIG. 16 is a side view of an "air dam" multi-system embodiment of the invention.

FIG. 16 shows a multi-system "air dam" power generating system 340 which would be suitable for locating between two mountains 342 and 344 or across a canyon or between two tall and strong towers. System 340 is constructed with a strong tether support line 346 anchored to natural elevation feature 342 at point 348 and anchored to natural elevation feature 344 at point 350. Hanging down from tether support line 346 are a series of single cable systems 352, 354, 356, 358, 360, 362, 364, 366, and 368 which each are comprised of groups of self-orienting foils 372 which shuttle up and down pulling respective cables, which in turn causes the four pulleys in each system to rotate, one of which is combined with a power-take-off to remove power from the system. The power-take-offs in system 340 are located on or near the valley floor 374. The power removed from each system can then be fed via connections 376 to power house 378 for further processing, storage or transmission.

Grid power is not required to carry out 'black starts', i.e. starting a translating foil system from a prolonged standstill condition. All necessary starting energy can be provided by onboard or system associated supplies.

Figure 17:
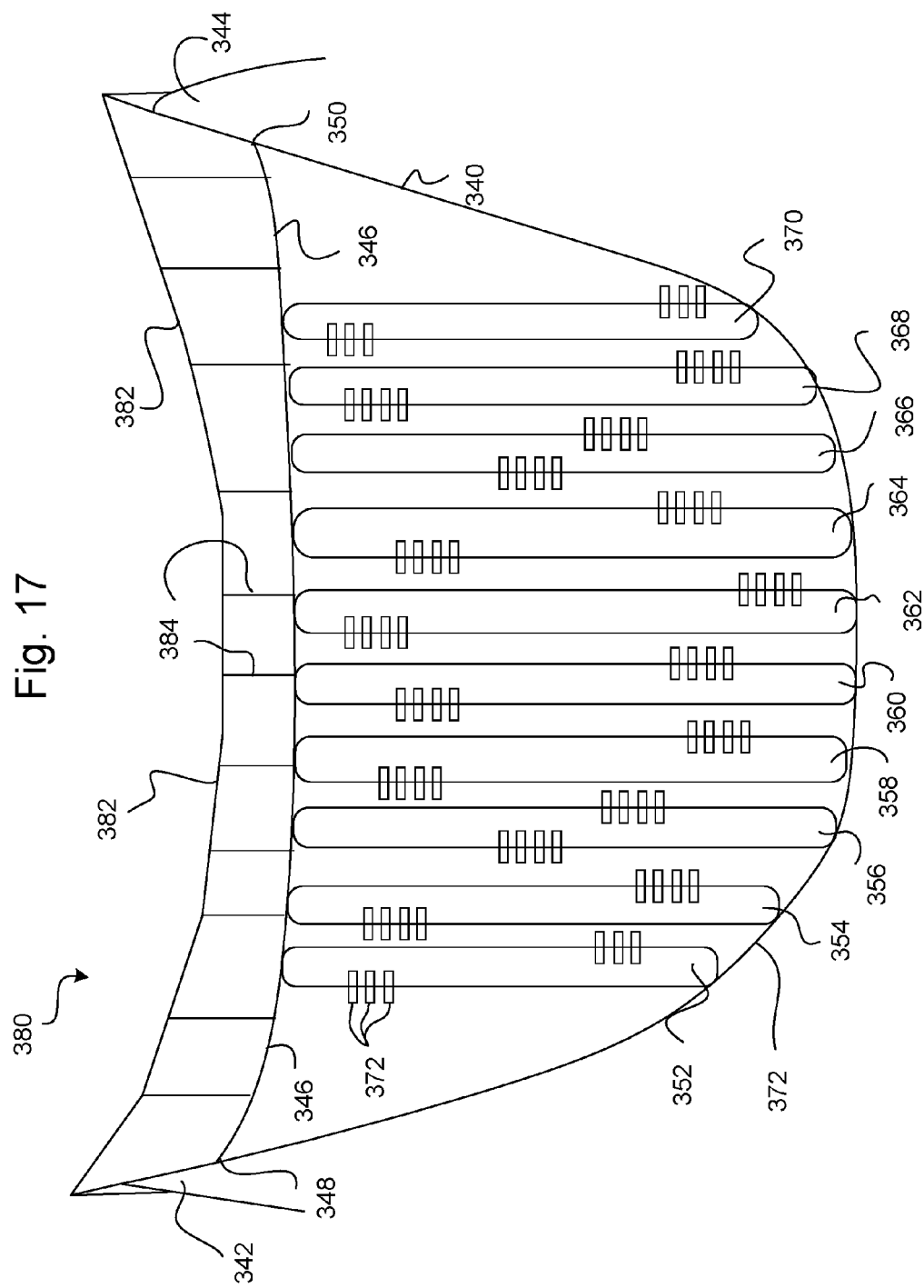
FIG. 17 is a side view of another "air dam" multi-system embodiment of the invention.

FIG. 17 shows a multi-system "air dam" power generating system 380 with additional reinforcing structure added to support the system weight. Support line 382 is anchored to natural elevation features 342 and 344 and strung across the tether support line 346. Suspension support cables 384 connect support line 382 to tether support line 346 to support and distribute weight, similar to known technology used in supporting suspension bridges.

Multiple air dam systems 340 and 380 can be installed in rapid succession in a local geographic area, for example it may be possible for air dam systems to be separated by a distance of as little as 500 meters resulting in a being able operate a number of high output air dam systems in a very close proximity to each other. Such system density brings with it significant economies such as reduced road building, single centralized maintenance facilities and any crew quarters as well as a single grid connection.

In alternate embodiments, a system similar to 340 or 380 could be employed under water, likely with the power-take-offs at or near the surface. In situations of underwater currents that occur a distance below the water surface the translational operating ranges may be adjusted to best harness the kinetic energy in the current.

In accordance with this invention, power is removed from the system in a shuttling, start and stop operation. Generally the longer the translational operating range, the longer the energy harvesting duration before the foil must stop and reverse direction. For most translating foil systems, the shuttle motion along the translating operating range can be arranged to operate horizontally, vertically, or diagonally in relation to the ground and seafloor. Run of river and tidal installations are usually best suited for horizontal operations.

Changing the direction of foils by reversing the necessary high and low pressure areas of the foils, can be achieved in several ways. In a multi-cable suspended system such as described in embodiments 10, 50 and 60, the upper downstream cable lengths can be lengthened or shortened to change the collective foils' angle of attack by way of selectively rotating pulleys with respect to, one, two or more of the four cables. Similarly, two of the cables can be effectively lengthened at one end and shortened at the other end to adjust the angle of attack of the foils by adding and removing additional pulleys or obstacles in the path of the cables. As the flow rate is monitored, the relative location of each of the cables can be adjusted to adjust the relative angle of attack. A reversed angle of attack for a foil, relative to the fluid flow, causes the foil to reverse direction.

Computer controls supported by real-time fluid velocity measurements taken onboard each foil are used to adjust each foil's angle of attack to make each individual foil, within a standalone multi-foil system, harvest energy at its peak potential at any given moment. Computer controls can also be used to control the velocity of a desired shuttle such that it hits the end of travel point at an exact point in time. Calculations and micro adjustments can be made many times per second, taking into account each foil's translational velocity and local wind stream velocity.

Operating foil systems in a co-generation fashion with existing long proven temporary energy storage means, facilitates the ability to operate translating foil systems at full harvest potential, all the time, for every hour of every day of every year.

The translating foil approach to kinetic energy harvesting lends itself well to scaling, this is demonstrated by a range of applications of sailboats starting with a child's small toy sailboat, to the very largest commercial sailing vessels which today have almost 100 meter tall sails. Consequently, commercial applications are viable for translating foil installations as small 1 kV installations for remote mining or villages, all the way through to very large installations producing 10 s of megawatts. The viability of scaling translating foil systems is directly attributable to the simplicity of components used and the lack of extreme stress to components, in contrast to other conventional wind or water energy conversion systems.

Extremely large underwater foils, or sails, can be used at very low overall cost, to effective harvest the immense kinetic energy contained in slow moving ocean currents. The use of extremely large hydrofoils, such as ones with surface areas each of 5000 $m^2$ or more, make it possible for hydrofoils to make contact with tens of thousands, or even hundreds of thousands, of cubic meters of slow moving ocean current. Such foil systems would operate at slow translational velocities, however the power output combined with extreme torque will allow a single foil system, using a number of large submarine hydro-sail foils to harvest into the hundreds of megawatts with each shuttle travel along the translational operating range.

In waterborne foil systems in accordance with the invention the use of on-board computer systems located on large floating structures such as barges restrained to the ocean floor by way of cables similar to large oil drilling platforms, can facilitate the reliable and low cost harvest of available kinetic energy even hundreds of kilometers offshore. The reliability of such systems is greatly increased given that in many cases no high maintenance systems need to be located underwater. As foils are cable suspended, harvesting from very deep ocean depths is possible without impeding surface vessel travel.

Foils can be used in run of river and tidal flow installations to operate in virtually all flow conditions, from very low up to high flow conditions. The continuous and reliable operation increases the viability and reduces the overall cost of implementing such systems.

The foils in accordance with this invention can be equipped with a foil stabilization augmentation system, whether a canard or empennage or similar stabilization controller, that can be adjusted in real-time by an onboard computerized control system. A stability augmentation system senses movement of the foil in up or down motions and makes slight adjustments to counteract any undesired oscillation of the foil. The foils described above in single-cable-loop systems have separate upper and lower leading and trailing edges which, when controlled separately, can be used as a stabilization augmentation system to avoid unnecessary bouncing of the foils. The four-cable-systems, particularly those with single foils, could make use of selectively adjusting each cable to adjust the angle of attack of the foil to counteract oscillation. In other cases stabilization means may be added to individual foils to provide longitudinal (pitch) and/or directional (yaw) stability and control.

Figure 18:
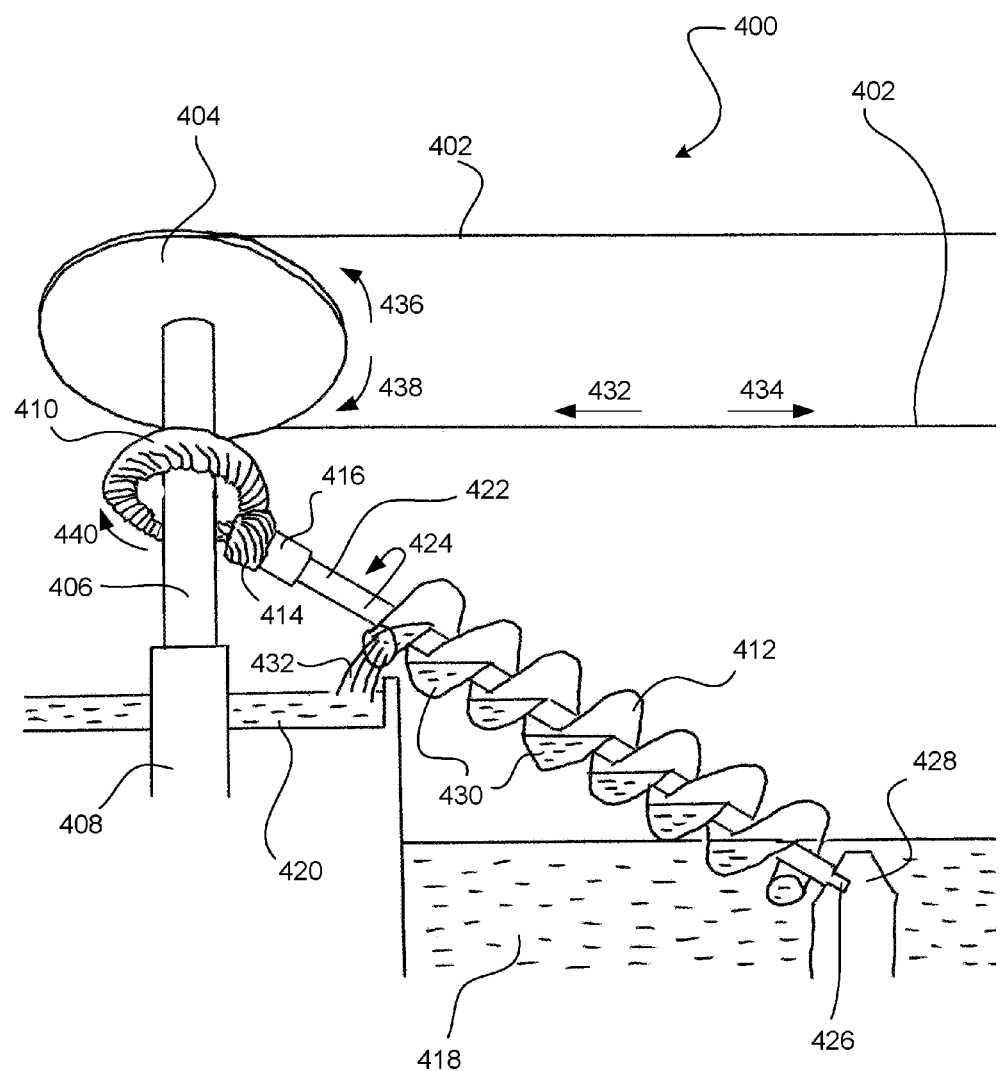
FIG. 18 is a side view of a first power take-off system.

FIG. 18 shows example power take-off system 400. Movement of cable 402 causes pulley 404 to rotate, which causes shaft 406 to rotate. The shaft 406 and pulley 404 is held in place by support 408.

Useable mechanical energy can be removed from the rotating shaft by a variety of means, including by coupling through use of belts or worm gears to transfer the rotational energy to other shafts or devices for doing work.

FIG. 18 shows worm gear 410 attached to shaft 406 such that rotation of shaft 406 causes rotation of worm gear 410. In system 400 an Archimedes screw 412 is shown as an example for taking power off the shaft 422. Rotation of the worm gear 410 causes worm gear 414 to rotate, which in turn causes the Archimedes screw 412 to rotate. Incorporation of a sprag clutch 416 results in rotation of the Archimedes screw 412 in only one direction. When the pulley 404 rotates in the opposite direction, the sprag clutch freely rotates without causing the Archimedes screw 412 to rotate.

Although this is shown in FIG. 18 in a very simplified example, other power take-offs can be coupled to the same shaft for removing useable energy. For example, a second Archimedes screw could similarly be connected directly or indirectly to the shaft to remove power and perform work when the pulley moves in the opposite direction. Similarly an electric power generator or other devices could be coupled to the shaft to remove power and perform work or store power for later use.

In system 400, the Archimedes screw 412 moves water 430 from a lower body of water 418 to an upper body of water 420. This could be useful for a variety of purposes, such as irrigation or for power storage as power can be later removed from water flowing from the upper body of water 420 to the lower body of water 418.

Archimedes screw 412 has a pivot point 426 that rotates in its rotation anchor 428.

As the shuttle foil moves back and forth, cable 402 moves first in directions 432 and 434. Movement of the cable in direction 432 causes movement of pulley 404 in direction 438, whereas movement of cable 402 in direction 434 causes movement of pulley 404 in direction 436.

In FIG. 18 only movement in directions 432 and 438 cause movement of the worm gear 410 in direction 440, which will cause Archimedes screw 412 to rotate in direction 424 to perform work, thereby taking power from shaft 406. The sprag clutch 416 prevents rotation of the Archimedes screw 412 when the cable 402 and pulley 404 rotates in the opposite directions.

Archimedes screw 412 is shown with a single direction worm gear connection direction to the shaft although it is understood that rotation could be transferred via various intermediate steps, whether using worm gears, or belts, or any other method of transferring rotational power as is well known in the art. The Archimedes screw 412 is illustrated with a single worm gear connection to the shaft 406 but it is to be understood that an Archimedes screw 412 and/or any other device taking power off shaft 406 can be coupled indirectly thereto, and the coupling can be detachable such that power can be taken off only during certain times, such as when the foils have reached an acceptable acceleration in a particular direction such that the shaft 406 is turning at a certain minimum speed. In addition, additional power take-offs could be connected, and/or the load of individual power take-offs can be increased as the foils near the near the end of their translational operating distance such that the act of increasing the load of power taken off the shaft 406 will slow the foil(s). The system may be optimized such that maximum power is taken off the shaft, which effectively results in stopping the foil(s) as the foil(s) reaches the end of its translational operating distance. Removing the load from the shaft will then permit the foil(s) to freely commence acceleration in the opposite direction once the angle of attack of the foil(s) is adjusted.

Figure 19:
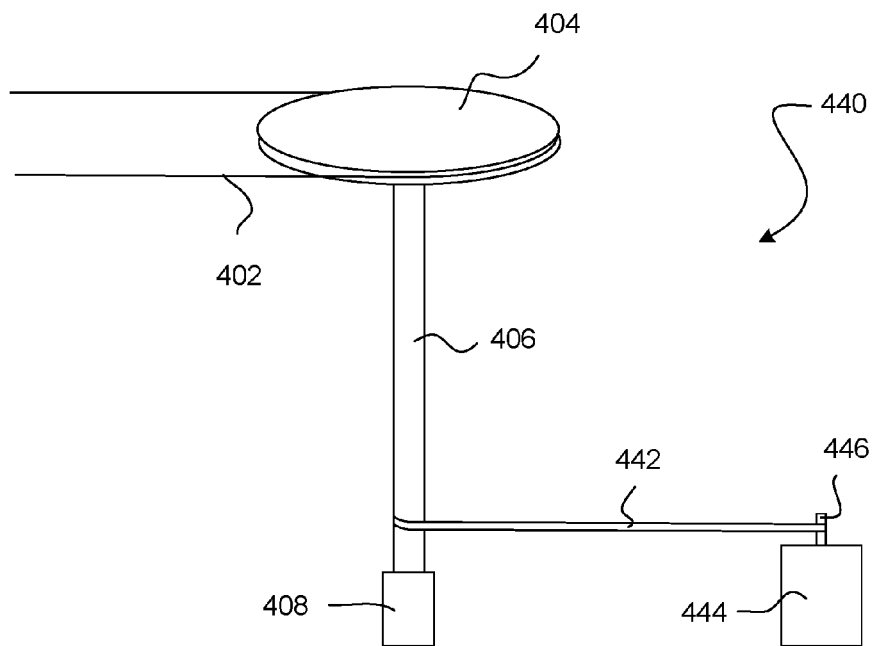
FIG. 19 is a side view of a second power take-off system.

FIG. 19 shows example power take-off system 440, which illustrates a simple belt 442 for taking power off shaft 406 and translating the power to the shaft 446 of electrical generator 444.

Figure 20:
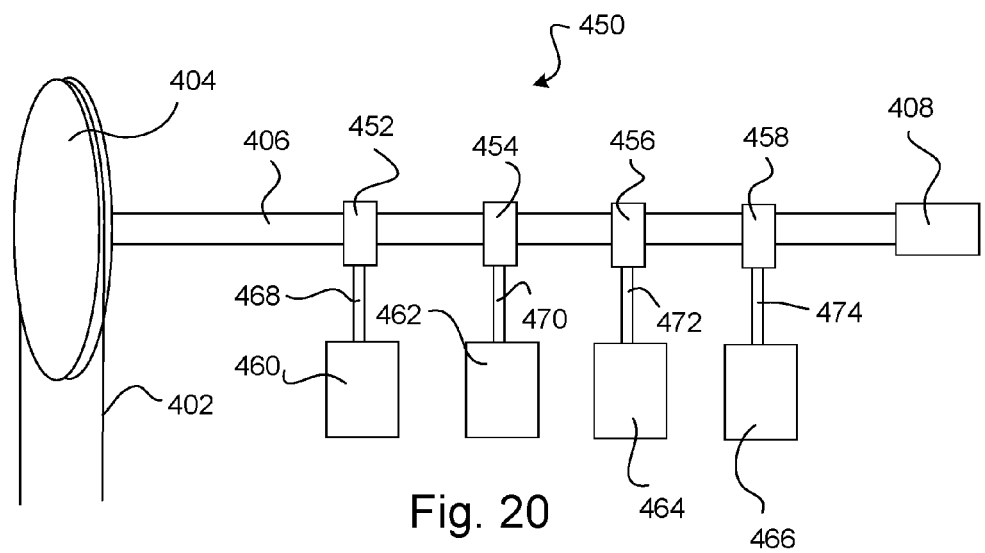
FIG. 20 is a side view of a third power take-off system.

FIG. 20 shows example power take-off system 450, which illustrates four different locations in which power can be taken off shaft 406, namely at power take-off locations 452, 454, 456, and 458 for connecting power using devices 460, 462, 464, and 466. Connections 468, 470, 472 and 474 can be direct or indirect connections, such as worm gears or belt drives, or other suitable methods for transferring rotational kinetic energy. Power using devices 460, 462, 464, and 466 could consist of any combination of devices which can use kinetic energy, for example, devices for compressing air, pumping hydro, charging a battery, generating direct current (DC), generating electricity that connects to a grid, etc.

Control means for increasing a load could be as simple as flipping a switch which would be set up to connect or disconnect a power using device 460 from shaft 406 for example by causing a minor shift in the location of one end of a belt such that the power using device is engaged or not engaged by rotation of the shaft 406. In systems where multiple power using devices are coupled to shaft 406, coupling additional power using device to shaft 406 will increase the load. In other systems, a single power using device, such as an electrical generator, may have settings that permit load to be increased or decreased. An operator would increase load as the foil(s) nears the end of the translational operating distance, and decrease the load when the foil stops and changes direction. Optimized systems could have maximum load applied as the foil(s) nears the end of the translational operating distance which is braking means that would stop the foil(s). Increasing load applies brakes to the foil.

Braking means in an efficient use of this invention involves increasing load on shaft 406. Conventional physical brakes, such as disc brakes, for slowing and stopping one or more pulleys or shafts can also be suitable braking means that can be applied. Conventional brakes can be applied as an emergency measure or in systems that are not able to maximize efficiency of power take-off. Further, adjusting the angle of attack of the foil(s) functions as braking means if it is done before the foil(s) comes to a stop as adjusting the angle such that the flow of fluid provides force in the opposite direction of translational movement and brakes the foil(s).

As described above, there are various means for adjusting the angle of attack of the foil(s). In system 10, a set of two cables, such as cables 16 and 20 can then be moved relative to the other set of two cables 18 and 22, such that the angle of attack of foils 12 and 14 relative to the stream-flow is changed. This change in the angle of attack then causes the foils 12 and 14 to commence a translation in the opposite direction. Another means for adjusting the angle of attack of the foil(s) in relation to four cable systems is selectively applying load to two pulleys while not applying load, or lessening the load on the other two pulleys. In system 10, this would also result in cables 16 and 20 moving relative to the other set of two cables 18 and 22, such that the angle of attack of foils 12 and 14 relative to the stream-flow is changed.

The means for adjusting the angle of attack for foil in systems 170 and similar systems could be manually moving the foils, could be flipping a powered switch to move the foils, it could be manually turning a wheel which winds a cable to adjust the relative distances of left and right cables tethered to shuttle 174 on tether line 176, and it could be as simple as placing a piece of wood in water on one side while removing a piece of wood from the other side, the latter two as in practice in reaction ferries.

The means for adjusting the angle of attack for foil 242 as shown in FIG. 12 is performed by changing the direction of trim tab 274 which results in movement of the longer flap 276, which in turn causes the angle of attack of foil 242 to change. In computer controlled systems this means of adjusting angle of attack could be programmed to occur automatically as the foil 242 reaches a particular point at or near the end of the translational operating distance. However a computer program is not required as in simpler implementations the means for adjusting the angle of attack of foil 242 can merely be a person flipping a switch which, via remote control, changes the angle of the trim tab 274 from one direction to another when the foil reaches a particular position in the translational operating distance. When the angle of attack of a foil is reversed, the cross flow of fluid will cause the foil to translate in the opposite direction.

As will be apparent to those skilled in the art in the light of the foregoing disclosure the present invention is not limited by what has been particularly shown and described herein. Rather the scope of the present invention includes both combinations and sub-combinations of the features described hereinabove as well as modifications and variations thereof which would occur to a person of skill in the art upon reading the foregoing description and which are not in the prior art. Furthermore, many alterations and modifications are possible in the practice of this invention without departing from the spirit or scope thereof. Accordingly, the scope of the invention is to be construed in accordance with the substance defined by the following claims.

What is claimed is:

1. Apparatus for converting kinetic energy from a flowing fluid into useable energy comprising;
   a first closed-loop cable;
   a first foil coupled to said first cable such that translational movement of said first foil causes translational movement of said first cable;
   said first foil having an angle of attack adjustable between a first angle position and a second angle position, such that flowing fluid acting on said first foil when in said first angle position causes translational movement of said first foil in a first translational direction, and said flowing fluid acting on said first foil when in said second angle position causes translational movement of said first foil in a second translational direction;
   first and second pulleys, said first cable looping around each of said first and second pulleys such that movement of said first cable in said first translational direction causes rotational movement of said first and second pulleys in a first rotational direction, and movement of said first cable in said second translational direction causes rotational movement of said first and second pulleys in a second rotational direction, said first and second pulleys not being submerged in liquid;
   a power-take-off coupled to said first pulley for harvesting useable energy;
   control means for increasing a load at said power-take-off to reduce movement of said first foil upon said first foil reaching a first end of a translating operating range; and
   means for adjusting said angle of attack of said first foil between said first angle position and said second angle position;

third and fourth pulleys, said first cable looping around each of said third and fourth pulleys such that movement of said first cable causes movement of said third and fourth pulleys;

a second foil coupled to said first cable such that translational movement of said second foil causes translational movement of said first cable;

second, third and fourth cables, said first, second, third and fourth cables being coupled to said first and second foils at corners of said first and second foils.

2. An apparatus as in claim 1, further comprising braking means at said first pulley for braking said first foil upon said first foil reaching said first end of said translating operating range.

3. An apparatus as in claim 2, wherein harvesting useable energy comprises generating electricity.

4. An apparatus as in claim 2, wherein harvesting useable energy comprises compressing air.

5. An apparatus as in claim 2, wherein harvesting useable energy comprises producing hydrogen by electrolysis of water.

6. An apparatus as in claim 2, wherein harvesting useable energy comprises charging a battery.

7. An apparatus as in claim 2, further comprising a generator; and, said harvesting useable energy comprising said generator generating grid power electricity.

8. An apparatus as in claim 2, said first foil further comprising a leading edge and a trailing edge whereby said means for adjusting said angle of attack comprises adjusting a relative positioning of said leading edge and said trailing edge with respect to said foil.

9. An apparatus as in claim 8, said harvesting useable energy comprising storing energy in a short term energy storage.

10. An apparatus as in claim 9, further comprising a generator, said generator generating grid power electricity from said energy stored in said short term energy storage.

11. Apparatus for converting kinetic energy from a single flowing fluid into useable energy comprising;
a tether line strung between first and second anchor points on opposing natural terrain elevation features;
first and second pulleys anchored to said tether line, said first and second pulleys not being submerged in liquid;
third and forth pulleys anchored to a valley floor;
a first closed-loop cable passing around said first, second, third and forth pulleys;
first and second foils coupled to said first cable such that translational movement of said first and second foils causes translational movement of said first cable;
said first and second foils having a first loop angle of attack adjustable between a first angle position and a second angle position, such that flowing fluid acting on said first and second foils when in said first angle position causes translational movement of said first and second foils in a first translational direction, and said flowing fluid acting on said first and second foils when in said second angle position causes translational movement of said first and second foils in a second translational direction;

said first cable looping around each of said first, second, third and fourth pulleys such that movement of said cable in said first translational direction causes rotational movement of said first, second, third and fourth pulleys in a first rotational direction, and movement of said cable in said second translational direction causes rotational movement of said first, second, third and fourth pulleys in a second rotational direction;
a first power-take-off coupled to said first or third pulley for harvesting useable energy;
first control means for increasing a first load at said first power-take-off to reduce movement of said first and second foils upon said first and second foils reaching a first end of a translating operating range;
means for adjusting said first loop angle of attack of said first and second foils between said first angle position and said second angle position;
fifth and sixth pulleys anchored to said tether line;
seventh and eighth pulleys anchored to said valley floor;
a second closed-loop cable passing around said fifth, sixth, seventh and eighth pulleys;
third and fourth foils coupled to said second cable such that translational movement of said third and fourth foils causes translational movement of said second cable;
said third and fourth foils having a second loop angle of attack adjustable between a third angle position and a fourth angle position, such that flowing fluid acting on said third and fourth foils when in said third angle position causes translational movement of said third and fourth foils in a third translational direction, and said flowing fluid acting on said third and fourth foils when in said fourth angle position causes translational movement of said third and fourth foils in a fourth translational direction;
said second cable looping around each of said fifth, sixth, seventh and eighth pulleys such that movement of said second cable in said third translational direction causes rotational movement of said fifth, sixth, seventh and eighth pulleys in a third rotational direction, and movement of said cable in said fourth translational direction causes rotational movement of said fifth, sixth, seventh and eighth pulleys in a fourth rotational direction;
a second power-take-off coupled to said fifth or seventh pulley for harvesting useable energy;
second control means for increasing a second load at said second power-take-off to reduce movement of said third and fourth foils upon said third and fourth foils reaching a third end of a second translating operating range; and
means for adjusting said angle of attack of said third and fourth foils between said third angle position and said fourth angle position.

12. An apparatus as in claim 11, said harvesting useable energy comprising storing energy in a short term energy storage.

13. An apparatus as in claim 12, further comprising a generator, said generator generating grid power electricity from said energy stored in said short term energy storage.

* * * * *